US012763088B2

(12) United States Patent
Dai et al.

(10) Patent No.: US 12,763,088 B2
(45) Date of Patent: Oct. 13, 2026

(54) SPEECH ENHANCEMENT

(71) Applicant: Dolby Laboratories Licensing Corporation, San Francisco, CA (US)

(72) Inventors: Jia Dai, Beijing (CN); Kai Li, Beijing (CN); Xiaoyu Liu, Dublin, CA (US); Richard J. Cartwright, Killara (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 108 days.

(21) Appl. No.: 18/577,586

(22) PCT Filed: Jul. 12, 2022

(86) PCT No.: PCT/US2022/036802
§ 371 (c)(1),
(2) Date: Jan. 8, 2024

(87) PCT Pub. No.: WO2023/287773
PCT Pub. Date: Jan. 19, 2023

(65) Prior Publication Data

US 2024/0177726 A1 May 30, 2024

Related U.S. Application Data

(60) Provisional application No. 63/260,203, filed on Aug. 12, 2021.

(51) Int. Cl.
*G10L 21/0208* (2013.01)
*G06N 3/08* (2023.01)
*G10L 21/0232* (2013.01)

(52) U.S. Cl.
CPC ............ *G10L 21/0208* (2013.01); *G06N 3/08* (2013.01); *G10L 21/0232* (2013.01); *G10L 2021/02082* (2013.01)

(58) Field of Classification Search
CPC ............. G10L 21/0208; G10L 21/0232; G10L 2021/02082; G06N 3/08; G06N 3/0442;
(Continued)

(56) References Cited

U.S. PATENT DOCUMENTS 8,082,147 B2 12/2011 Parthasarathy
8,099,284 B2 1/2012 Arizmendi
(Continued)

FOREIGN PATENT DOCUMENTS

CN 107680586 B 2/2018
CN 110728989 B 7/2020
(Continued)

OTHER PUBLICATIONS

Falk et al., "A Non-Intrusive Quality and Intelligibility Measure of Reverberant and Dereverberated Speech," IEEE Transactions on Audio, Speech, and Language Processing, vol. 18, No. 7, Sep. 2010, pp. 1766-1774, 9 pages.
(Continued)

*Primary Examiner* — Yogeshkumar Patel

(57) ABSTRACT

A method for enhancing audio signals is provided. In some implementations, the method involves (a) obtaining a training set comprising a plurality of training samples, each training sample comprising a distorted audio signal and a clean audio signal. In some implementations, the method involves (b), for a training sample of the plurality of training samples: obtaining a frequency-domain representation of the distorted audio signal; providing the frequency-domain representation to a convolutional neural network (CNN) comprising a plurality of convolutional layers and to a recurrent element, wherein an output of the recurrent element is provided to a subset of the plurality of convolutional layers; generating a predicted enhancement mask, wherein the CNN generates the predicted enhancement mask; generating a
(Continued)

predicted enhanced audio signal based on the predicted enhancement mask; and updating weights associated with the CNN and the recurrent element based on the predicted enhanced audio signal.

20 Claims, 11 Drawing Sheets

(58) Field of Classification Search
CPC .......... G06N 3/0464; G06N 3/09; G06N 3/04; G06N 3/044; H04S 7/305
See application file for complete search history.

(56) References Cited

U.S. PATENT DOCUMENTS

| | | | | |
|---|---|---|---|---|
| 8,290,170 | B2 | 10/2012 | Nakatani | |
| 9,269,369 | B2 | 2/2016 | Lou | |
| 9,293,134 | B1 | 3/2016 | Saleem | |
| 9,502,029 | B1 | 11/2016 | Bell | |
| 9,615,171 | B1 | 4/2017 | Jeffrey | |
| 9,685,173 | B2 | 6/2017 | Sharma | |
| 9,721,582 | B1 | 8/2017 | Huang | |
| 9,754,604 | B2 | 9/2017 | Wolff | |
| 9,774,976 | B1 | 9/2017 | Baumgarte | |
| 9,972,315 | B2 | 5/2018 | Gomez | |
| 10,438,604 | B2 | 10/2019 | Petkov | |
| 10,490,204 | B2 | 11/2019 | Markovich Golan | |
| 10,540,961 | B2 | 1/2020 | Arik | |
| 10,546,593 | B2 | 1/2020 | Wung | |
| 10,598,543 | B1 | 3/2020 | Mansour | |
| 10,657,955 | B2 | 5/2020 | Battenberg | |
| 10,810,996 | B2 | 10/2020 | Willett | |
| 10,872,602 | B2 | 12/2020 | Nosrati | |
| 12,008,457 | B1 | 6/2024 | Isik | |
| 12,014,748 | B1 | 6/2024 | Giri | |
| 2005/0010410 | A1 | 1/2005 | Takiguchi | |
| 2009/0232297 | A1 | 9/2009 | Takada | |
| 2011/0317522 | A1 | 12/2011 | Florencio | |
| 2014/0037073 | A1 | 2/2014 | Chih-Kai | |
| 2014/0355794 | A1 | 12/2014 | Morrell | |
| 2016/0019884 | A1 | 1/2016 | Xiao | |
| 2016/0027435 | A1 | 1/2016 | Pinto | |
| 2016/0044159 | A1 | 2/2016 | Wolff | |
| 2016/0210976 | A1 | 7/2016 | Lopez | |
| 2016/0253994 | A1 | 9/2016 | Panchapagesan | |
| 2016/0345116 | A1 | 11/2016 | Yen | |
| 2017/0019746 | A1 | 1/2017 | Oh et al. | |
| 2017/0162194 | A1 | 6/2017 | Nesta | |
| 2017/0245081 | A1 | 8/2017 | Lyren | |
| 2017/0278513 | A1 | 9/2017 | Li | |
| 2017/0295445 | A1 | 10/2017 | Christoph | |
| 2017/0365256 | A1 | 12/2017 | Stylianou | |
| 2019/0043482 | A1 | 2/2019 | Li | |
| 2019/0043491 | A1 | 2/2019 | Kupryjanow | |
| 2019/0172477 | A1 | 6/2019 | Bocko | |
| 2019/0267018 | A1 | 8/2019 | Birchall | |
| 2019/0304482 | A1 | 10/2019 | Schreibman | |
| 2019/0362711 | A1 | 11/2019 | Nosrati | |
| 2019/0364379 | A1 | 11/2019 | Davidson | |
| 2019/0385590 | A1 | 12/2019 | Omachi | |
| 2020/0066296 | A1 * | 2/2020 | Sargsyan | G10L 21/0232 |
| 2020/0137508 | A1 | 4/2020 | Lee | |
| 2020/0168208 | A1 | 5/2020 | Mitra | |
| 2020/0219528 | A1 | 7/2020 | Chowdhary | |
| 2021/0035563 | A1 | 2/2021 | Cartwright | |
| 2021/0110840 | A1 | 4/2021 | Chu | |
| 2021/0142815 | A1 | 5/2021 | Bryan | |

FOREIGN PATENT DOCUMENTS

| | | | | |
|---|---|---|---|---|
| CN | 109841226 B | | 10/2020 | |
| CN | 112652290 B | | 1/2023 | |
| CN | 112767959 B | | 10/2023 | |
| CN | 111883091 B | | 7/2024 | |
| GB | 2576320 B | | 4/2021 | |
| JP | 2004004954 A | | 1/2004 | |
| JP | 2015219413 A | | 12/2015 | |
| JP | 2020112787 A | | 7/2020 | |
| WO | 2010057997 A1 | | 5/2010 | |
| WO | 2016100231 A1 | | 6/2016 | |
| WO | 2017/072118 A1 | | 5/2017 | |
| WO | 2017164954 A1 | | 9/2017 | |
| WO | 2019139660 A1 | | 7/2019 | |
| WO | WO-2020042707 A1 | * | 3/2020 | G10L 25/30 |
| WO | 2021068120 A1 | | 4/2021 | |

OTHER PUBLICATIONS

Berkun, R. et al "Microphone Array Power Ratio for Quality Assessment of Reverberated Speech" EURASIP Journal on Advances in Signal Processing, Jun. 18, 2015, pp. 1-11.

Bryan, Nicholas J., "Impulse Response Data Augmentation and Deep Neural Networks for Blind Room Acoustic Parameter Estimation," Submission Oct. 21, 2019, May 4-8, 2020, Google Scholar, Adobe Research, San Francisco, CA, USA, https://arxiv.org/abs/1909.03642, https://ieeexplore.ieee.org/document/9052970, pp. 1-5.

Campbell, Joseph P. "Speaker Recognition: a Tutorial" IEEE, vol. 85, No. 9, pp. 1437-1462, Sep. 1997.

Gao et al., "Joint training of DNNs by incorporating an explicit dereverberation structure for distant speech recognition," EURASIP Journal on Advances in Signal Processing; New York vol. 2016, (Aug. 2016): pp. 1-14.

Hagen, A. et al "Recent Advances in the Multi-Stream HMM/ANN Hybrid Approach to Noise Robust ASR" Computer Speech & Language, Jan. 2005, vol. 19, No. 1, pp. 3-30, abstract only included, pp. 1-2.

Han et al., "Learning Spectral Mapping for Speech Dereverberation and Denoising," IEEE, Jun. 2015, IEEE/ACM Transactions on Audio, Speech, and Language Processing ( vol. 23, Issue: 6, Jun. 2015) https://ieeexplore.ieee.org/abstract/document/7067387, pp. 982-992, 11 pages.

Kepuska, V.Z. et al "A Novel Wake-up-word Speech Recognition System, wake-up-word Recognition Task, Technology and Evaluation" Nonlinear Analysis, Theory, Methods & Applications, vol. 71, Issue 12, Dec. 15, 2009, pp. e2772-e2789, Abstract only, 2 pages.

Kim, C. et al. "Generation of large-scale simulated utterances in virtual rooms to train deep-neural networks for far-field speech recognition in Google Home", Interspeech, Aug. 20-24, 2017, pp. 379-383, 5 pages.

Larsson et al., "Acoustic impulse response function estimation using machine learning," 2019, Google Scholar, Master's Thesis 2019, https://odr.chalmers.se/bitstream/20.500.12380/300319/1/Larsson_Viberg_2019.pdf, pp. i-98.

Petkov Petko N et al: "An Unsupervised Learning Approach to Neural-net-supported Wpe Dereverberation", ICASSP 2019—2019 IEEE International Conference on Acoustics, Speech and Signal Processing (ICASSP), IEEE, May 12, 2019 (May 12, 2019), pp. 5761-5765, XP033566091, DOI: 10.1109/ICASSP.2019.8683542 [retrieved on Apr. 4, 2019].

Porschmann, C. et al "Binauralization of Omnidirectional Room Impulse Responses Algorithm and Technical Evaluation" Google Scholar, Sep. 5-9, 2017, pp. 1-2.

Qian et al., "An Investigation Into Using Parallel Data for Far-Field Speech Recognition," In Acoustics, Speech and Signal Processing (ICASSP), 2016 IEEE International Conference on (pp. 5725-5729). IEEE, pp. 1-5.

Ritter et al., "Training Deep Neural Networks for Reverberation Robust Speech Recognition," IEEE, Speech Communication; 12. ITG Symposium, Date of Conference: Oct. 5-7, 2016, https://ieeexplore.ieee.org/abstract/document/7776212, pp. 382-386, 5 pages.

Sivasankaran, S. et al "A Combined Evaluation of Established and New Approaches for Speech Recognition in Varied Reverberation Conditions" Elsevier, Computer Speech & Language, vol. 46, Nov. 2017, pp. 444-460. Abstract Only, p. 1-.

Vaananen, Riitta "Efficient Modeling and Simulation of Room Reverberation" Jun. 3, 1997, Espoo, Finland, pp. 1-95.

(56) References Cited

OTHER PUBLICATIONS

Vogt, T. et al "Automatic Recognition of Emotions from Speech: a Review of the Literature and Recommendations for Practical Realisation: Affect and Emotion in Human-Computer Interaction" pp. 75-91, 2008.

Xiong, W. et al "The Microsoft 2017 conversational speech recognition system", ICASSP, Aug. 2017, pp. 1-9.

Yoshioka et al., "Making machines understand us in reverberant rooms: Robustness against reverberation for automatic speech recognition," Signal Processing, Magazine, IEEE, vol. 29, No. 6, pp. 114-126, 13 Pages, Nov. 2012.

Haderlein et al., "Using Artificially Reverberated Training Data in Distant-Talking ASR", Proc. of the Text, Speech, and Dialogue (TSD2005), Sep. 12, 2005, pp. 1-8.

Nishiki et al., "A Study on Robust Speech Recognition against Unknown Reverberation Using Single Speech Model Trained under Multiple Reverberant Environments" IEICE Technical Report, SP2006-8, WIT2008-8, pp. 1-7.

Tan et al., "Gated Residual Networks With Dilated Convolutions for Monaural Speech Enhancement", IEEE/ACM Trans. on Audio, Speech, and Language Processing, vol. 27, Issue 1, Oct. 15, 2018, pp. 189-198.

Tan et al., "Real-Time Speech Enhancement Using an Efficient Convolutional Recurrent Network for Dual-Microphone Mobile Phones in Close-Talk Scenarios", Proc. of the ICASSP 2019, Apr. 17, 2019, pp. 5751-5755.

* cited by examiner

SPEECH ENHANCEMENT

CROSS-REFERENCE TO RELATED APPLICATIONS

This application is a U.S. National Stage application under U.S.C. 371 of International Application No. PCT/US2022/036802, filed on Jul. 12, 2022 (reference: D20126AWO01), which claims the priority benefit of U.S. Provisional Application No. 63/260,203, filed on Aug. 12, 2021, and International Application No. PCT/CN2021/106536, filed on Jul. 15, 2021, the contents of each of which are hereby incorporated in its entirety.

TECHNICAL FIELD

This disclosure pertains to systems, methods, and media for speech enhancement via attenuating distortion.

BACKGROUND

Audio devices, such as headphones, speakers, etc. are widely deployed. People frequently listen to audio content (e.g., podcasts, radio shows, television shows, music videos, user-generated content, short-video, video meetings, teleconferencing meetings, panel discussions, interviews, etc.) that may include distortion, such as reverberation and/or noise. Additionally, audio content may include far-field audio content, such as background noise. Enhancement, such as dereverberation and/or noise suppression may be performed on such audio content. However, enhancement techniques may introduce unwanted perceptual distortions, such as changes in loudness or timbre.

NOTATION AND NOMENCLATURE

Throughout this disclosure, including in the claims, the terms “speaker,” “loudspeaker” and “audio reproduction transducer” are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation “on” a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression “system” is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term “processor” is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

SUMMARY

At least some aspects of the present disclosure may be implemented via methods. Some methods may involve (a) obtaining, by a control system, a training set comprising a plurality of training samples, each training sample of the plurality of training samples comprising a distorted audio signal and a corresponding clean audio signal. Some methods may involve (b) for a training sample of the plurality of training samples: obtaining, by the control system, a frequency-domain representation of the distorted audio signal; providing, by the control system, the frequency-domain representation of the distorted audio signal to a convolutional neural network (CNN) comprising a plurality of convolutional layers and to a recurrent element, wherein an output of the recurrent element is provided to a subset of the plurality of convolutional layers; generating, by the control system and using the CNN, a predicted enhancement mask, wherein the CNN generates the predicted enhancement mask based at least in part on the output of the recurrent element; generating, by the control system, a predicted enhanced audio signal based at least in part on the predicted enhancement mask; and updating, by the control system, weights associated with the CNN and the recurrent element based at least in part on the predicted enhanced audio signal and the corresponding clean audio signal. Some methods may involve (c) repeating (b) by the control system until a stopping criteria is reached, wherein the updated weights at a time the stopping criteria is reached correspond to a trained machine learning model for enhancing audio signals.

In some examples, obtaining the frequency-domain representation of the distorted audio signal comprises: generating an initial frequency-domain representation of the distorted audio signal; and applying a filter that represents filtering of a human cochlea to the initial frequency-domain representation of the distorted audio signal to generate the frequency-domain representation of the distorted audio signal.

In some examples, the plurality of convolutional layers comprise a first subset of convolutional layers with increasing dilation values and a second subset of convolutional layers with decreasing dilation values. In some examples, an output of a convolutional layer of the first subset of convolutional layers is passed to a convolutional layer of the second subset of convolutional layers having a same dilation value. In some examples, the output of the recurrent element is provided to the second subset of convolutional layers.

In some examples, the output of the recurrent element is provided to the subset of the plurality of convolutional layers by reshaping the output of the recurrent element.

In some examples, generating the predicted enhanced audio signal comprises multiplying the predicted enhancement mask by the frequency-domain representation of the distorted audio signal.

In some examples, methods may further involve using the updated weights to generate at least one enhanced audio signal by providing a distorted audio signal to the trained machine learning model.

In some examples, the recurrent element is a gated recurrent unit (GRU).

In some examples, the recurrent element is a long short-term memory (LSTM) network or an Elman recurrent neural network (RNN).

In some examples, the distorted audio signal includes reverberation and/or noise.

In some examples, the trained machine learning model for enhancing audio signals is used for noise suppression and/or dereverberation.

In some examples, updating the weights associated with the CNN and the recurrent element comprises determining a loss term based at least in part on a degree of reverberation present in the predicted enhanced audio signal. In some examples, the loss term is determined further based on a difference between the predicted enhanced audio signal and a clean audio signal corresponding to the training sample. In some examples, the loss term is a weighted sum of (i) the difference between the predicted enhanced audio signal and the clean audio signal and (ii) the degree of reverberation.

Some methods may involve obtaining, by a control system, a distorted audio signal. Some methods may involve generating, by the control system, a frequency-domain representation of the distorted audio signal. Some methods may involve providing, by the control system, the frequency-domain representation to a trained machine learning model, wherein the trained machine learning model comprises a convolutional neural network (CNN) comprising a plurality of convolutional layers and to a recurrent element, wherein an output of the recurrent element is provided to a subset of the plurality of convolutional layers. Some methods may involve determining, by the control system, an enhancement mask based on an output of the trained machine learning model. Some methods may involve generating, by the control system, a spectrum of an enhanced audio signal based at least in part on the enhancement mask and the distorted audio signal. Some methods may involve generating, by the control system, the enhanced audio signal based on the spectrum of the enhanced audio signal.

In some examples, obtaining the frequency-domain representation of the distorted audio signal comprises: generating an initial frequency-domain representation of the distorted audio signal; and applying a filter that represents filtering of a human cochlea to the initial frequency-domain representation of the distorted audio signal to generate the frequency-domain representation of the distorted audio signal.

In some examples, the plurality of convolutional layers comprise a first subset of convolutional layers with increasing dilation values and a second subset of convolutional layers with decreasing dilation values. In some examples, an output of a convolutional layer of the first subset of convolutional layers is passed to a convolutional layer of the second subset of convolutional layers having a same dilation value. In some examples, the output of the recurrent element is provided to the second subset of convolutional layers.

In some examples, the output of the recurrent element is provided to the subset of the plurality of convolutional layers by reshaping the output of the recurrent element.

In some examples, the recurrent element is a gated recurrent unit (GRU).

In some examples, the recurrent element is a long short-term memory (LSTM) network or an Elman recurrent neural network (RNN).

In some examples, generating the enhanced audio signal comprises multiplying the enhancement mask by the frequency-domain representation of the distorted audio signal.

In some examples, the distorted audio signal is a live-captured audio signal.

In some examples, the distorted audio signal includes one or more of reverberation or noise.

In some examples, the trained machine learning model has been trained to perform dereverberation and/or noise suppression.

In some examples, methods further involve causing the enhanced audio signal to be presented by one or more speaker devices.

Some methods involve (a) obtaining, by a control system, a training set comprising a plurality of training samples, each training sample of the plurality of training samples comprising a reverberated audio signal and a corresponding clean audio signal. Some methods involve (b) for a training sample of the plurality of training samples: providing, by the control system, a representation of the reverberated audio signal to a machine learning model comprising a set of weights; generating, by the control system and using the machine learning model, a predicted dereverberated audio signal based at least in part on the representation of the reverberated audio signal; determining, by the control system, a loss term based at least in part on a degree of reverberation present in the predicted dereverberated audio signal; and updating the set of weights based at least in part on the loss term. Some methods involve (c) repeating (b) by the control system until a stopping criteria is reached, wherein the updated set of weights at a time the stopping criteria is reached comprise a trained machine learning model for dereverberating audio signals.

In some examples, the degree of reverberation is based on a two-dimensional acoustic-modulation frequency spectrum of the predicted dereverberated audio signal. In some examples, the degree of reverberation comprises a ratio of energy in a high modulation frequency portion of the two-dimensional acoustic-modulation frequency spectrum to energy over a low modulation frequency portion of the two-dimensional acoustic-modulation frequency spectrum. In some examples, the ratio is determined for each of a plurality of critical bands of the predicted dereverberated audio signals. In some examples, the degree of reverberation comprises a mean of the ratio over the plurality of critical bands.

In some examples, the loss term is determined further based on a difference between the predicted dereverberated audio signal and a clean audio signal corresponding to the training sample. In some examples, the loss term is a weighted sum of: (i) the difference between the predicted dereverberated audio signal and the clean audio signal and (ii) the degree of reverberation.

In some examples, some methods further involve using the updated weights to generate at least one dereverberated audio signal by providing a reverberated audio signal to the trained machine learning model.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via an apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Audio signals may include various types of distortions, such as noise and/or reverberation. For example, reverberation occurs when an audio signal is distorted by various reflections off of various surfaces (e.g., walls, ceilings, floors, furniture, etc.). Reverberation may have a substantial impact on sound quality and speech intelligibility. Accordingly, dereverberation of an audio signal may be performed, for example, to improve speech intelligibility and clarity.

Sound arriving at a receiver (e.g., a human listener, a microphone, etc.) is made up of direct sound, which includes sound directly from the source without any reflections, and reverberant sound, which includes sound reflected off of various surfaces in the environment. The reverberant sound includes early reflections and late reflections. Early reflections may reach the receiver soon after or concurrently with the direct sound, and may therefore be partially integrated into the direct sound. The integration of early reflections with direct sound creates a spectral coloration effect which contributes to a perceived sound quality. The late reflections arrive at the receiver after the early reflections (e.g., more than 50-80 milliseconds after the direct sound). The late reflections may have a detrimental effect on speech intelligibility. Accordingly, dereverberation may be performed on an audio signal to reduce an effect of late reflections present in the audio signal to thereby improve speech intelligibility.

Figure 1:
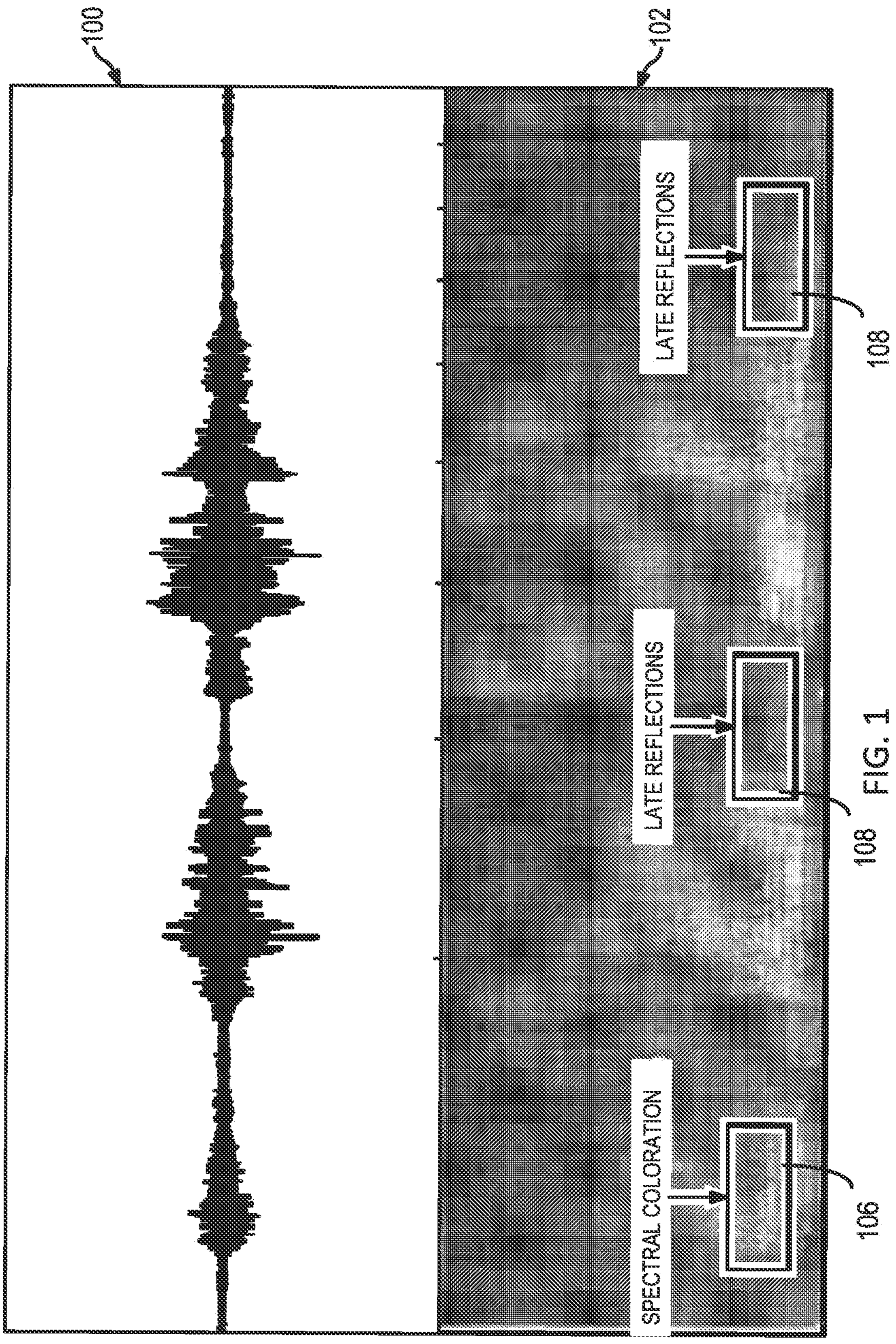
FIG. 1 shows an example of an audio signal in the time domain and in the frequency domain in accordance with some implementations.

FIG. 1 shows an example of a time domain input audio signal 100 and a corresponding spectrogram 102. As illustrated in spectrogram 102, early reflections may produce changes in spectrogram 104 as depicted by spectral colorations 106. Spectrogram 104 also illustrates late reflections 108, which may have a detrimental effect on speech intelligibility.

It may be difficult to perform enhancement (e.g., dereverberation and/or noise suppression) on audio signals such that speech intelligibility is improved by the enhancement, and, such that the perceptual quality of the audio signal is preserved. For example, machine learning models, such as deep neural networks, may be used to predict a dereverberation mask that, when applied to a reverberated audio signal, generates a dereverberated audio signal. However, training such machine learning models may be computationally intensive and inefficient. For example, such machine learning models may require a high degree of complexity to be able to achieve some degree of accuracy. As a more particular example, such machine learning models may include a vast number of layers, thereby requiring that a corresponding vast number of parameters be optimized. Moreover, such complex machine learning models may be prone to overfitting, due to training on limited training sets and a large number of parameters that are to be optimized. In such cases, such machine learning models may both be computationally intensive to train, and, may ultimately achieve lower performance.

Disclosed herein are methods, systems, media, and techniques for enhancing audio signals using low-complexity machine learning models and/or using augmented training sets. As described herein (e.g., in connection with FIGS. 4A, 4B, 5A, and 5B), augmented training sets may be generated by generating synthesized acoustic impulse responses (AIRs). Augmented training sets may be able to better span potential combinations of room environments, noise, speaker types, etc., that may allow a machine learning model to be trained using a larger and more representative training set, thereby alleviating the problem of model overfitting. Additionally, as described herein, a low-complexity machine learning model may be used that utilizes a convolutional neural network (CNN) with a relatively small number of layers (and therefore, a relatively small number of parameters to be optimized) in combination with a recurrent element. By combining a CNN with a recurrent element in parallel (e.g., as shown in and described below in connection with FIG. 6), a low-complexity machine learning model may be trained that generates smooth enhancement masks in a computationally-efficient manner. In particular, the recurrent element may inform the CNN portions of audio signals that are to be used in subsequent iterations of training, thereby leading to smoother predicted enhancement masks. Examples of recurrent elements that may be used include a gated recurrent unit (GRU), a long short-term memory (LSTM) network, an Elman recurrent neural network (RNN), and/or any other suitable recurrent element. Moreover, a loss function is described herein that allows a machine learning model to both generate a predicted enhanced audio signal that is accurate with respect to the signal of interest in the input distorted audio signal as well as to optimize for minimizing a degree of reverberation in the predicted clean audio signal. In particular, such a loss function, as described in more detail in connection with FIG. 7, may incorporate a parameter that approximates a degree of reverberation in a predicted clean audio signal, thereby allowing the machine learning model to be trained based on the ultimate parameter of interest—that is, whether an output signal is substantially dereverberated in comparison to an input signal.

In some implementations, an input audio signal can be enhanced using a trained machine learning model. In some implementations, the input audio signal can be transformed to a frequency domain by extracting frequency domain features. In some implementations, a perceptual transformation based on processing by the human cochlea can be applied to the frequency-domain representation to obtain banded features. Examples of a perceptual transformation that may be applied to the frequency-domain representation include a Gammatone filter, an equivalent rectangular bandwidth filter, a transformation based on the Mel scale, or the like. In some implementations, the frequency-domain representation may be provided as an input to a trained machine learning model that generates, as an output, a predicted enhancement mask. The predicted enhancement mask may be a frequency-domain representation of a mask that, when applied to the frequency-domain representation of the input audio signal, generates an enhanced audio signal. In some implementations, an inverse of the perceptual transformation may be applied to the predicted enhancement mask to generate a modified predicted enhancement mask. A frequency-domain representation of the enhanced audio signal may then be generated by multiplying the frequency-domain representation of the input audio signal by the modified predicted enhancement mask. An enhanced audio signal may then be generated by transforming the frequency-domain representation of the enhanced audio signal to the time-domain.

In other words, a trained machine learning model for enhancing audio signals may be trained to generate, for a given frequency-domain input audio signal, a predicted enhancement mask that, when applied to the frequency-domain input audio signal, generates a frequency-domain representation of a corresponding enhanced audio signal. In some implementations, a predicted enhancement mask may be applied to a frequency-domain representation of the input audio signal by multiplying the frequency-domain representation of the input audio signal and the predicted enhancement mask. Alternatively, in some implementations, the logarithm of the frequency-domain representation of the input audio signal may be taken. In such implementations, a frequency domain representation of the enhanced audio signal may be obtained by subtracting the logarithm of the predicted enhancement mask from the logarithm of the frequency-domain representation of the enhanced audio signal.

It should be noted that, in some implementations, training a machine learning model may include determining weights associated with one or more nodes and/or connections between nodes of the machine learning model. In some implementations, a machine learning model may be trained on a first device (e.g., a server, a desktop computer, a laptop computer, or the like). Once trained, the weights associated with the trained machine learning model may then be provided (e.g., transmitted to) a second device (e.g., a server, a desktop computer, a laptop computer, a media device, a smart television, a mobile device, a wearable computer, or the like) for use by the second device in dereverberating audio signals.

Figure 2:
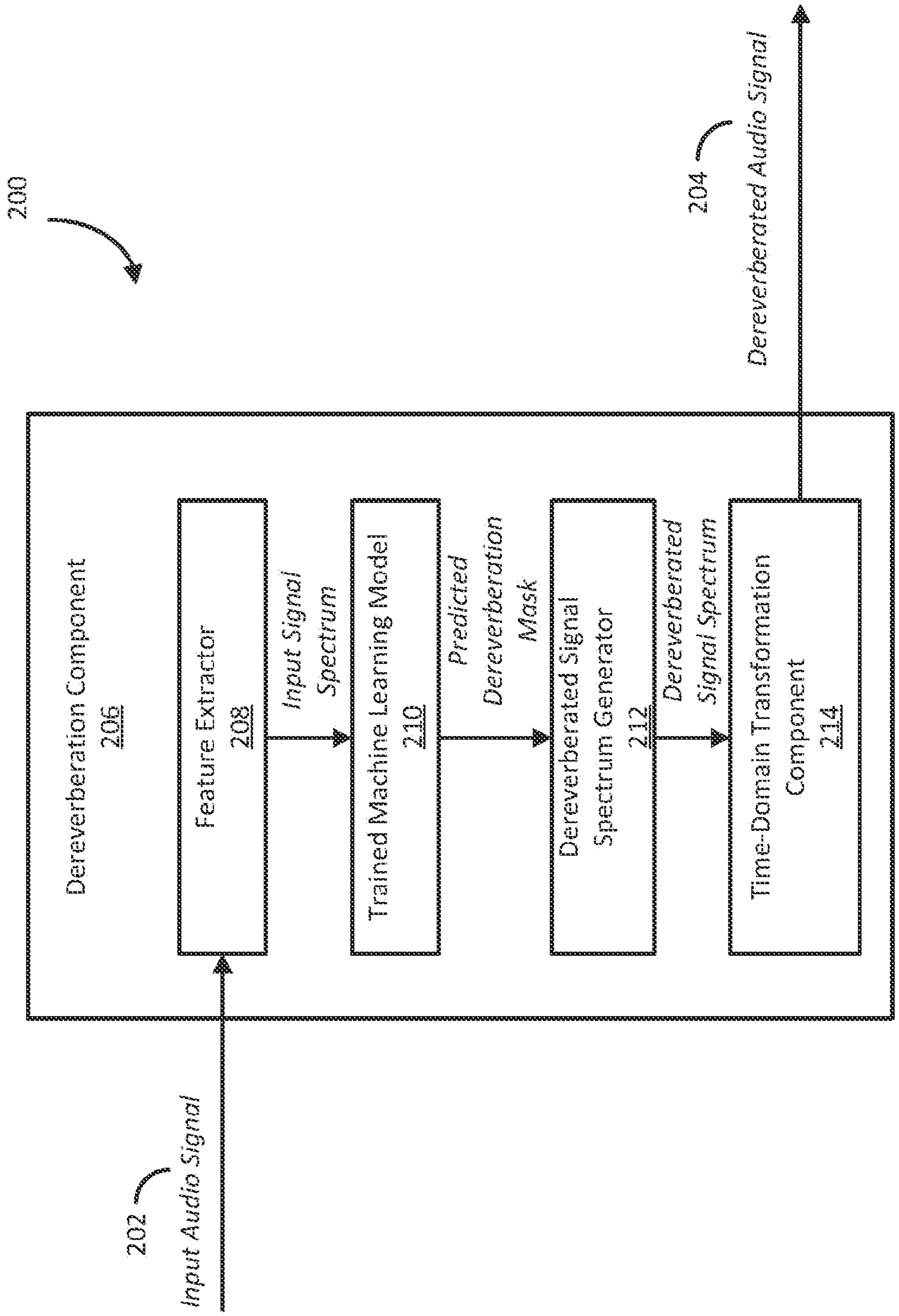
FIG. 2 shows a block diagram of an example system for performing dereverberation of audio signals in accordance with some implementations.
Figure 3:
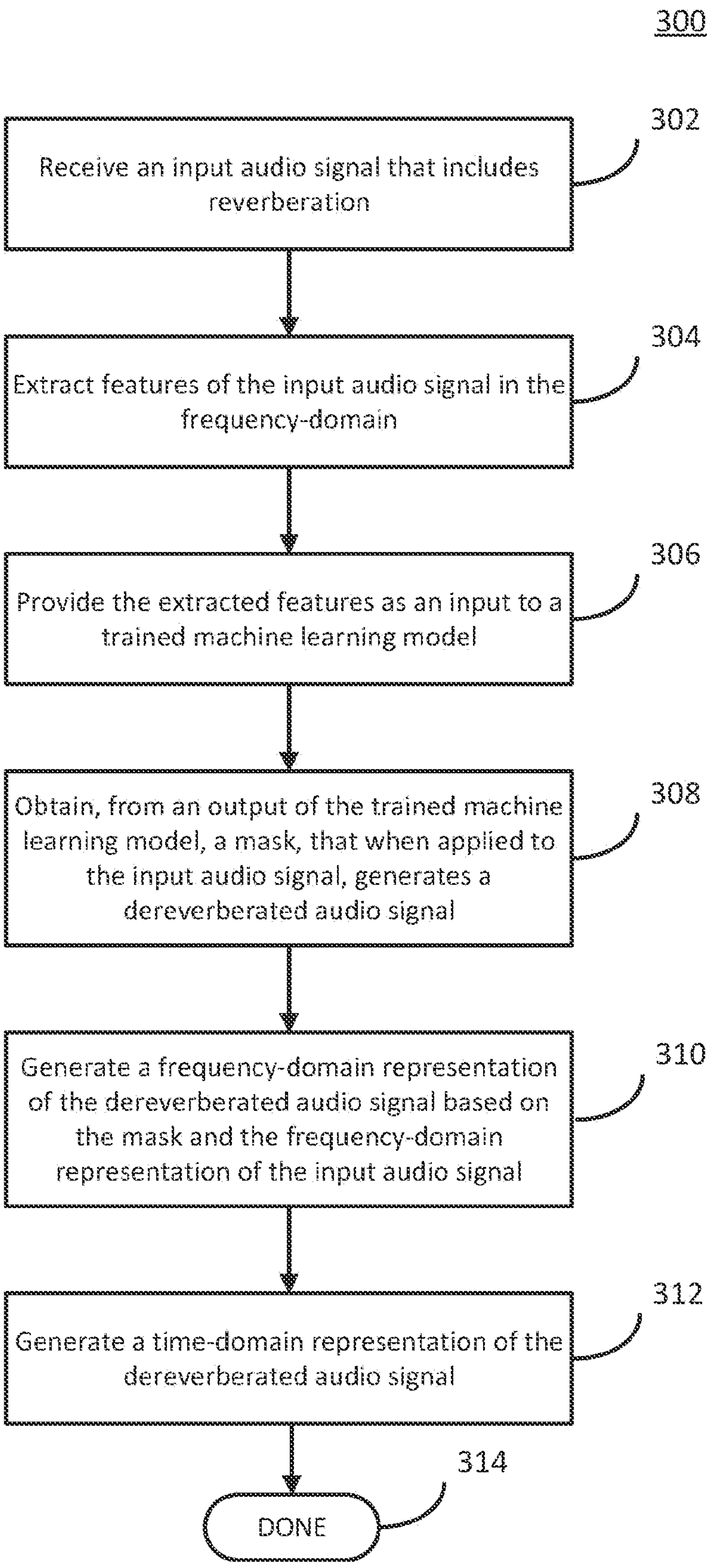
FIG. 3 shows an example of a process for performing dereverberation of audio signals in accordance with some implementations.

FIGS. 2 and 3 show examples of systems and techniques for dereverberating audio signals. It should be noted that although FIGS. 2 and 3 describe dereverberating audio signals, the systems and techniques described in connection with FIGS. 2 and 3 may be applied to other types of enhancement, such as noise suppression, a combination of noise suppression and dereverberation, or the like. In other words, rather than generating a predicted dereverberation mask and a predicted dereverberated audio signal, in some implementations, a predicted enhancement mask may be generated, and the predicted enhancement mask may be used to generate a predicted enhanced audio signals, where the predicted enhanced audio signal is a denoised and/or dereverberated version of a distorted input audio signal.

FIG. 2 shows an example of a system 200 for dereverberating audio signals in accordance with some implementations. As illustrated, a dereverberation audio component 206 takes, as an input, an input audio signal 202, and generates, as an output, a dereverberated audio signal 204. In some implementations, dereverberation audio component 206 includes a feature extractor 208. Feature extractor 208 may generate a frequency-domain representation of input audio signal 202, which may be considered the input signal spectrum. The input signal spectrum may then be provided to a trained machine learning model 210. The trained machine learning model 210 may generate, as an output, a predicted dereverberation mask. The predicted dereverberation mask may be provided to a dereverberated signal spectrum generator 212. Dereverberated signal spectrum generator 212 may apply the predicted dereverberation mask to the input signal spectrum to generate a dereverberated signal spectrum (e.g., a frequency-domain representation of the dereverberated audio signal). The dereverberated signal spectrum may then be provided to a time-domain transformation component 214. Time-domain transformation component 214 may generated dereverberated audio signal 204.

FIG. 3 shows an example process 300 for dereverberating audio signals in accordance with some implementations. In some implementations, the system shown in and described above in connection with FIG. 2 may implement blocks of process 300 to generate dereverberated audio signals. In some implementations, blocks of process 300 may be implemented by a user device, such as a mobile phone, a tablet computer, a laptop computer, a wearable computer (e.g., a smart watch, etc.), a desktop computer, a gaming console, a smart television, or the like. In some implementations, blocks of process 300 may be performed in an order not shown in FIG. 3. In some implementations, one or more blocks of process 300 may be omitted. In some implementations, two or more blocks of process 300 may be performed substantially in parallel.

Process 300 can begin at 302 by receiving an input audio signal that includes reverberation. The input audio signal may be a live-captured audio signal, such as live-streamed content, an audio signal corresponding to an in-progress video conference or audio conference, or the like. In some implementations, the input audio signal may be a pre-recorded audio signal, such as an audio signal associated with pre-recorded audio content (e.g., television content, a video, a movie, a podcast, or the like). In some implementations, the input audio signal may be received by a microphone of the user device. In some implementations, the input audio signal may be transmitted to the user device, such as from a server device, another user device, or the like.

At 304, process 300 can extract features of the input audio signal by generating a frequency-domain representation of the input audio signal. For example, process 300 can generate a frequency-domain representation of the input audio signal using a transform, such as a short-time Fourier transform (STFT), a modified discrete cosine transform (MDCT), or the like. In some implementations, the frequency-domain representation of the input audio signal is referred to herein as "binned features" of the input audio signal. In some implementations, the frequency-domain representation of the input audio signal may be modified by applying a perceptually-based transformation that mimics filtering of the human cochlea. Examples of perceptually-based transformations include a Gammatone filter, an equivalent rectangular bandwidth filter, a Mel-scale filter, or the like. The modified frequency-domain transformation is sometimes referred to herein as "banded features" of the input audio signal.

At 306, process 300 can provide the extracted features (e.g., the frequency-domain representation of the input audio signal or the modified frequency-domain representation of the input audio signal) to a trained machine learning model. The machine learning model may have been trained to generate a dereverberation mask that, when applied to the frequency-domain representation of the input audio signal, generates a frequency-domain representation of a dereverberated audio signal. In some implementations, the logarithm of the extracted features may be provided to the trained machine learning model.

The machine learning model may have any suitable architecture or topology. For example, in some implementations, the machine learning model may be or may include a deep neural network, a convolutional neural network (CNN), a long short-term memory (LSTM) network, a recurrent neural network (RNN), or the like. In some implementations, the machine learning model may combine two or more types of networks. For example, in some implementations, the machine learning model may combine a CNN with a recurrent element. Examples of recurrent elements that may be used include a GRU, an LSTM network, an Elman RNN, or the like. An example of a machine learning model architecture that combines a CNN with a GRU is shown in and described below in connection with FIG. 6. Note that techniques for training a machine learning model are shown in and described below in connection with FIG. 7.

At 308, process 300 can obtain, from an output of the trained machine learning model, a predicted dereverberation mask that, when applied to the frequency-domain representation of the input audio signal, generates a frequency-domain representation of the dereverberated audio signal. In some implementations, process 300 can modify the predicted dereverberation mask by applying an inverse perceptually-based transformation, such as an inverse Gammatone filter, an inverse equivalent rectangular bandwidth filter, or the like.

At 310, process 300 can generate a frequency-domain representation of the dereverberated audio signal based on the predicted dereverberation mask generated by the trained machine learning model and the frequency-domain representation of the input audio signal. For example, in some implementations, process 300 can multiply the predicted dereverberation mask by the frequency-domain representation of the input audio signal. In instances in which the logarithm of the frequency-domain representation of the input audio signal was provided to the trained machine learning model, process 300 can generate the frequency-domain representation of the dereverberated audio signal by subtracting the logarithm of the predicted reverberation mask from the logarithm of the frequency-domain representation of the input audio signal. Continuing with this example, process 300 can then exponentiate the difference of the logarithm of the predicted reverberation mask and the logarithm of the frequency-domain representation of the input audio signal to obtain the frequency-domain representation of the dereverberated audio signal.

At 312, process 300 can generate a time-domain representation of the dereverberated audio signal. For example, in some implementations, process 300 can generate the time-domain representation of the dereverberated audio signal by applying an inverse transform (e.g., an inverse STFT, an inverse MDCT, or the like) to the frequency-domain representation of the dereverberated audio signal.

Process 300 can end at 314.

In some implementations, after generating the time-domain representation of the dereverberated audio signal, the dereverberated audio signal may be played or presented (e.g., by one or more speaker devices of a user device). In some implementations, the dereverberated audio signal may be stored, such as in local memory of the user device. In some implementations, the dereverberated audio signal may be transmitted, such as to another user device for presentation by the other user device, to a server for storage, or the like.

In some implementations, a machine learning model for dereverberating audio signals may be trained using a training set. The training set may include any suitable number of training samples (e.g., 100 training samples, 1000 training samples, 10,000 training samples, or the like), where each training sample includes a clean audio signal (e.g., with no reverberation), and a corresponding reverberated audio signal. As described above in connection with FIGS. 2 and 3, the machine learning model may be trained, using the training set, to generate a predicted dereverberation mask that, when applied to a particular reverberated audio signal, generates a predicted dereverberated audio signal.

Training a machine learning model that can robustly generate predicted dereverberation masks for different reverberated audio signals may depend on the quality of the training set. For example, for a machine learning model to be robust, the training set may need to capture reverberation from a vast number of different room types (e.g., rooms having different sizes, layouts, furniture, etc.), a vast number of different speakers, etc. Acquiring such a training set is difficult. For example, a training set may be generated by applying various AIRs that each characterize a room reverberation to a clean audio signal, thereby generating pairs of a clean audio signal and a corresponding reverberated audio signal generated by convolving an AIR with the clean audio signal. However, there may be a limited number of real AIRs available, and the real AIRs that are available may not fully characterize potential reverberation effects (e.g., by not adequately capturing rooms of different dimensions, layouts, etc.).

Disclosed herein are techniques for generating an augmented training set that may be used to train a robust machine learning model for dereverberating audio signals. In some implementations, real AIRs are used to generate a set of synthesized AIRs. The synthesized AIRs may be generated by altering and/or modifying various characteristics of early reflections and/or late reflections of a measured AIR, as shown in and described below in connection with FIGS. 4A, 4B, and 5A. In some implementations, a real AIR may be a measured AIR that is measured in a room environment (e.g., using one or more microphones positioned in the room). Alternatively, in some implementations, a real AIR may be a modeled AIR, generated, for example, using a room acoustics model that incorporates room shape, materials in the room, a layout of the room, objects (e.g., furniture) within the room, and/or any combination thereof. By contrast, a synthesized AIR may be an AIR that is generated based on a real AIR (e.g., by modifying components and/or characteristics of the real AIR), regardless of whether the real AIR is measured or generated using a room acoustics model. In other words, a real AIR may be considered a starting point for generating one or more synthesized AIRs. Techniques for generating synthesized AIRs are shown in and described below in connection with FIG. 5A. The real and/or synthesized AIRs may then be used to generate a training set that includes training samples generated based on the real and synthesized AIRs, as shown in and described below in connection with FIG. 5B. For example, a training sample may include a clean audio signal and a corresponding reverberated audio signal that has been generated by convolving a synthesized AIR with the clean audio signal. Because many synthesized AIRs may be generated from a single real AIR, and because multiple reverberated audio signals may be generated from a single clean audio signal and a single AIR (whether measured or synthesized), the augmented training set may include a larger number of training samples that better capture the extend of potential reverberation effects, thereby leading to a more robust machine learning model when trained with the augmented training set.

Figure 4A:
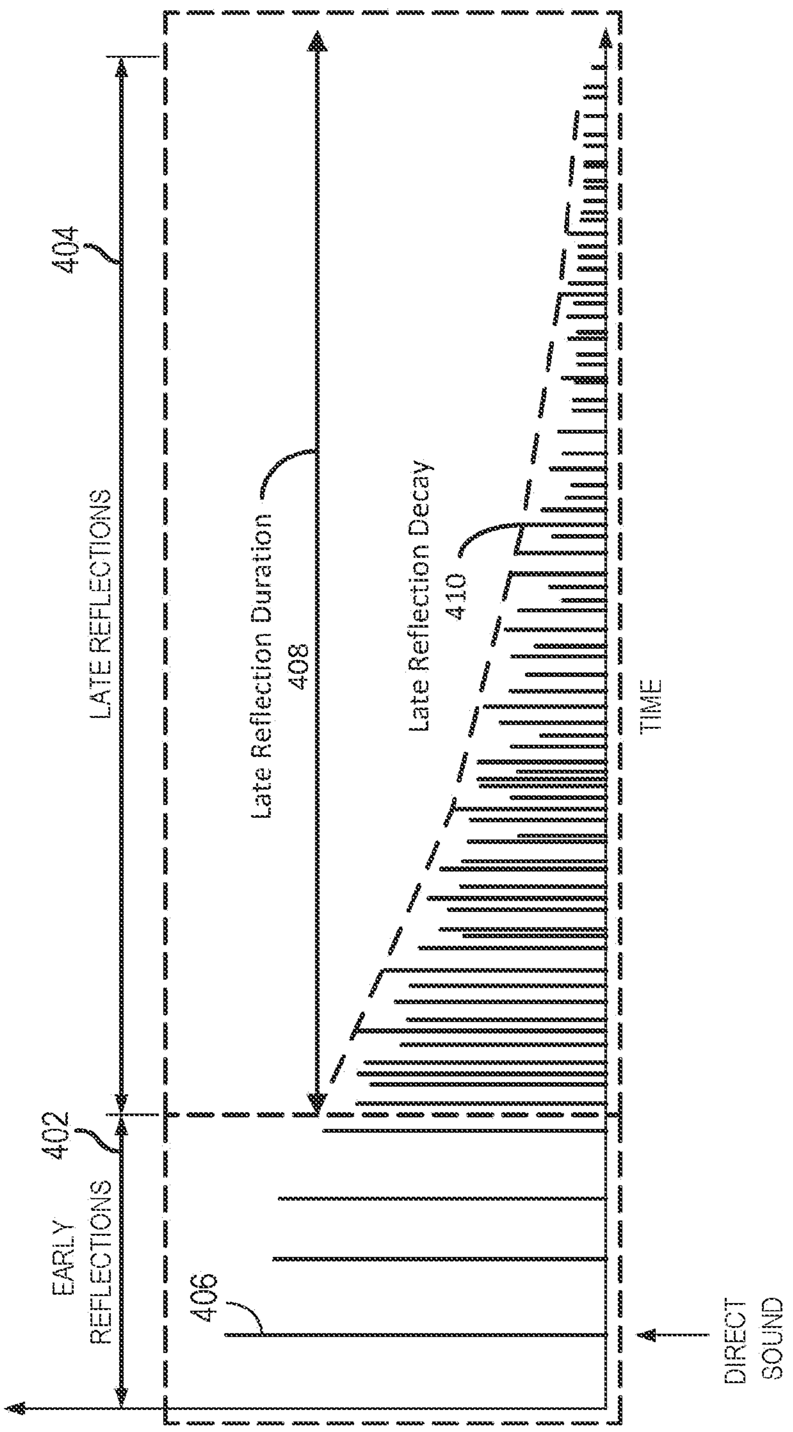
FIGS. 4A and 4B show examples of acoustic impulse responses (AIRs).

FIG. 4A shows an example of a measured AIR in a reverberant environment. As illustrated, early reflections 402 may arrive at a receiver concurrently or shortly after a direct sound 406. By contrast, late reflections 404 may arrive at the receiver after early reflections 402. Late reflections 404 are associated with a duration 408, which may be on the order of 100 milliseconds, 0.5 seconds, 1 second, 1.5 seconds, or the like. Late reflections 404 are also associated with a decay 410 that characterizes how an amplitude of late reflections 404 attenuates or decreases over time. In some instances, decay 410 may be characterized as an exponential decay, a linear function, a portion of a polynomial function, or the like. The boundary between early reflections and late reflections may be within a range of about 50 milliseconds and 80 milliseconds.

Figure 4B:
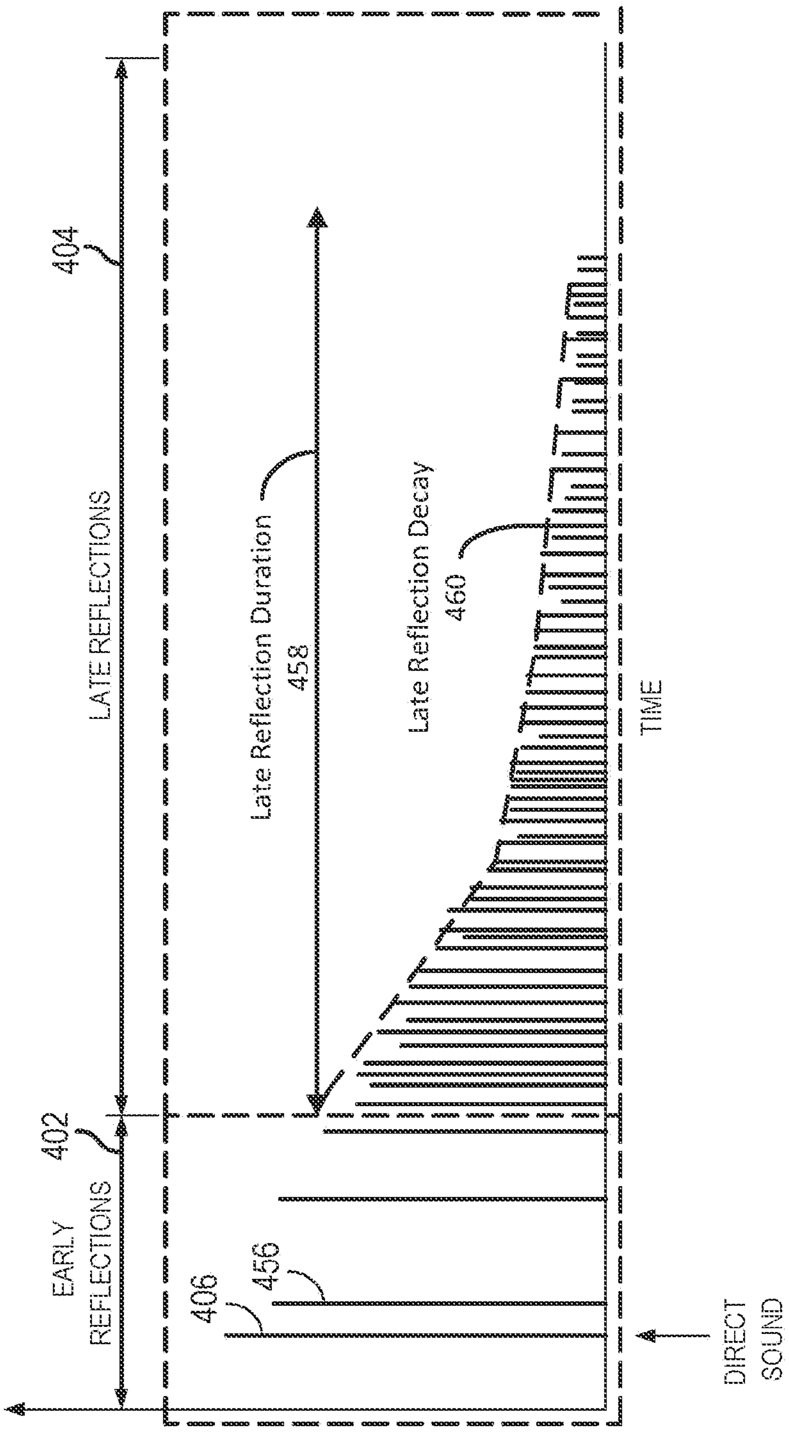

FIG. 4B shows a schematic representation of how the AIR depicted in FIG. 4A may be modified to generate a synthesized AIR. In some implementations, a time of a component of early reflections 402 may be modified. For example, as illustrated in FIG. 4B, a time of early reflection component 456 may be modified in the synthesized AIR, for example, to be earlier or later than a time of the early reflection component in the measured AIR. In some implementations, the duration of the late reflections may be modified. For example, referring to the synthesized AIR depicted in FIG. 4B, duration 458 is truncated relative to duration 408 of the corresponding measured AIR. In some implementations, a shape of a decay of the late reflections may be modified in the synthesized AIR. For example, referring to the synthesized AIR depicted in FIG. 4B, decay 458 is steeper than corresponding decay 408 of the measured AIR, causing late reflection components of the synthesized AIR to be more attenuated relative to the measured AIR.

Figure 5A:
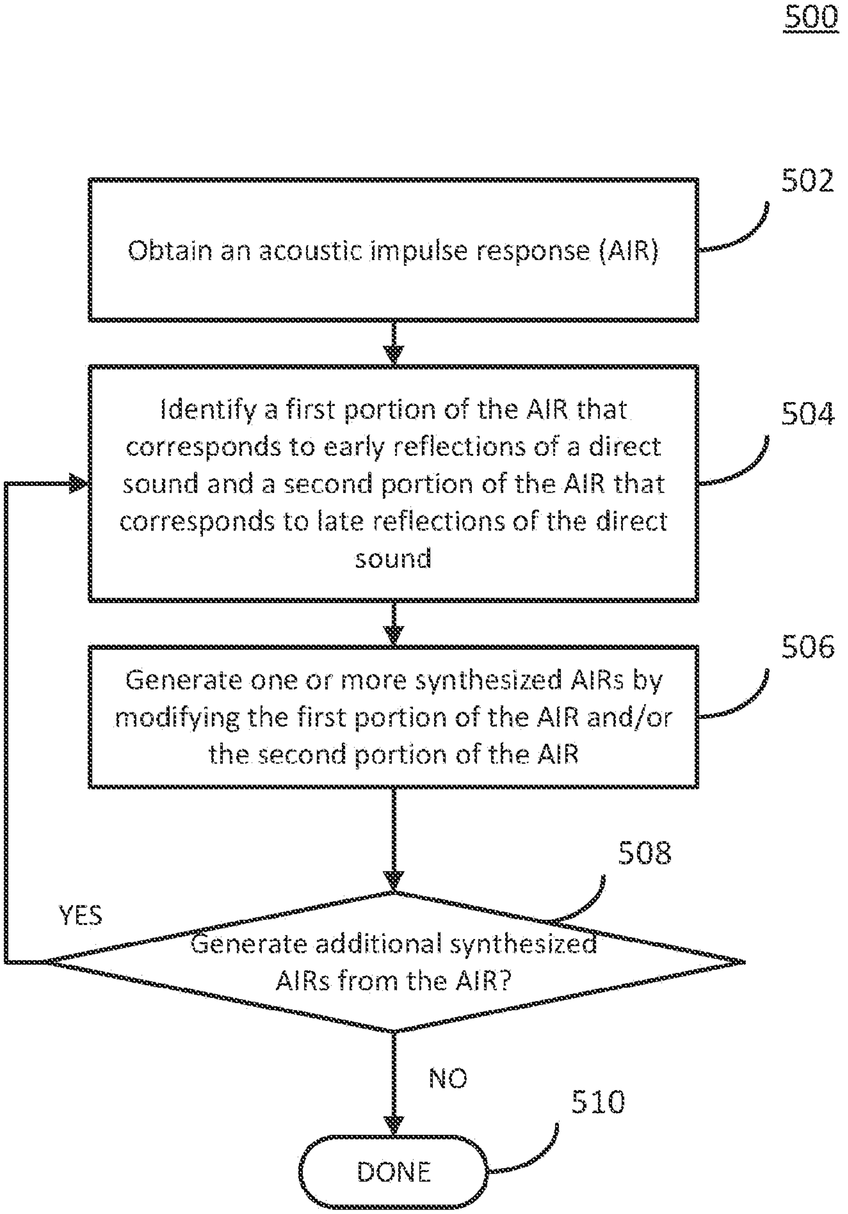
FIG. 5A shows an example of a process for generating synthesized AIRs in accordance with some implementations.

FIG. 5A shows an example of a process 500 for generating one or more synthesized AIRs from a single real AIR. In some implementations, blocks of process 500 may be implemented by a device that generates an augmented training set for training of a machine learning model for dereverberating audio signals, such as a server, a desktop computer, a laptop computer, or the like. In some implementations, two or more blocks of process 500 may be performed substantially in parallel. In some implementations, blocks of process 500 may be performed in an order not shown in FIG. 5A. In some implementations, one or more blocks of process 500 may be omitted.

Process 500 can begin at 502 by obtaining an AIR. The AIR may be a real AIR. For example, the AIR may be measured using a set of microphones within a reverberant room environment. As another example, the AIR may be an AIR generated using a room acoustics model. The AIR may be obtained from any suitable source, such as a database that stores measured AIRs, or the like.

At 504, process 500 can identify a first portion of the AIR that corresponds to early reflections of a direct sound and a second portion of the AIR that corresponds to late reflections of the direct sound. In some implementations, process 500 can identify the first portion and the second portion by identifying a separation boundary between early reflections and late reflections in the AIR. The separation boundary may correspond to a time point in the AIR that divides the AIR into early reflections and late reflections. In some implementations, the separation boundary may be identified by selecting a random value from within a predetermined range. Examples of the predetermined range include 15 milliseconds-85 milliseconds, 20 milliseconds-80 milliseconds, 30 milliseconds-70 milliseconds, or the like. In some implementations, the separation boundary may be a random value selected from any suitable distribution corresponding to the predetermined range (e.g., a uniform distribution, a normal distribution, or the like).

At 506, process 500 can generate one or more synthesized AIRs by modifying portions of the early reflections and/or the late reflections of the AIR. In some implementations, the early reflections and the late reflections may be identified within the AIR based on the separation boundary identified at block 504. In some implementations, process 500 may generate a synthesized AIR by modifying portions of the early reflections of the AIR. For example, as shown in and described above in connection with FIG. 4B, process 500 may modify time points of one or more components of the early reflection. In some implementations, process 500 may modify an order of one or more components of the early reflection. For example, in some implementations, process 500 may modify the order of the one or more components of the early reflection such that the one or more components of the early reflection have different time points within the early reflection part of the AIR. In some implementations, components of the early reflection portion of the AIR may be randomized.

In some implementations, process 500 may generate a synthesized AIR by modifying portions of the late reflections of the AIR. For example, as shown in and described above in connection with FIG. 4B, process 500 may modify a duration of the late reflections in the synthesized AIR by randomly selecting a time duration after which to truncate the late reflections from a predetermined range. In some implementations, the predetermined range may be determined based on a time point that separates the first portion of the AIR and the second portion of the AIR (e.g., the separation boundary) identified at block 502. For example, in some implementations, the late reflections may be truncated at a randomly selected time duration selected from the range of from the separation boundary to 1 second, from the separation boundary to 1.5 seconds, or the like.

As another example, in some implementations, process 500 may generate a synthesized AIR by modifying a decay associated with the late reflections. As a more particular example, in some implementations, process 500 may generate a decay function (e.g., an exponential decay function, a linear decay, etc.). Continuing with this more particular example, process 500 may then modify amplitudes of components of the late reflections subject to the generated decay function. In some implementations, this may cause the synthesized AIR to have late reflection components that are attenuated relative to the corresponding late reflection components of the measured AIR. Conversely, in some implementations, this may cause the synthesized AIR to have late reflection components that are amplified or boosted relative to the corresponding late reflection components of the measured AIR. Modification of the decay associated with the late reflections may change a reverberation time (RT), such as the time for reverberation to decrease by 60 dB (e.g., the RT60).

It should be noted that, in some implementations, a synthesized AIR may include modifications to both the early reflection components and the late reflection components. Moreover, in some implementations, early reflection components and/or late reflection components may be modified in multiple ways in a synthesized AIR relative to the real AIR. For example, in some implementations, a synthesized AIR may include late reflections that have both been truncated and late reflection components that have been modified in amplitude based at least in part on a modified decay applied to the late reflections of the synthesized AIR.

Additionally, in some implementations, the synthesized AIR may be further modified, e.g., in post-processing. For example, in some implementations, a direct-to-reverberant ratio (DRR) associated with the synthesized AIR may be modified. As a more particular example, in some implementations, the DRR associated with the synthesized AIR may be modified by applying a gain to a portion (e.g., an early reflection portion of the synthesized AIR) to increase or decrease the DRR. In some implementations, multiple modified synthesized AIRs may be generated from a single synthesized AIR. For example, in some implementations, multiple modified synthesized AIRs may be generated by applying different gains, each corresponding to a different modified synthesized AIR, to the single synthesized AIR.

At 508, process 500 can determine whether additional synthesized AIRs are to be generated based on the AIR obtained at block 502. In some implementations, process 500 can determine whether additional synthesized AIRs are to be generated based on whether a target or threshold number of synthesized AIRs that are to be generated from the AIR have been generated. For example, in an instance in which N synthesized AIRs are to be generated from a particular AIR, process 500 can determined whether N synthesized AIRs have been generated from the AIR obtained at block 502. It should be noted that N may be any suitable value, such as 1, 5, 10, 20, 50, 100, 500, 1000, 2000, etc.

If, at 508, process 500 determines that additional synthesized AIRs are not to be generated ("no" at block 508), process 500 can end at 510. Conversely, if, at block 508, process 500 determines that additional synthesized AIRs are to be generated ("yes" at block 508), process 500 can loop back to block 504 and can identify a different first portion of the AIR and second portion of the AIR obtained at block 502. By looping through blocks 504-508, process 500 may generate multiple synthesized AIRs from a single measured AIR.

Figure 5B:
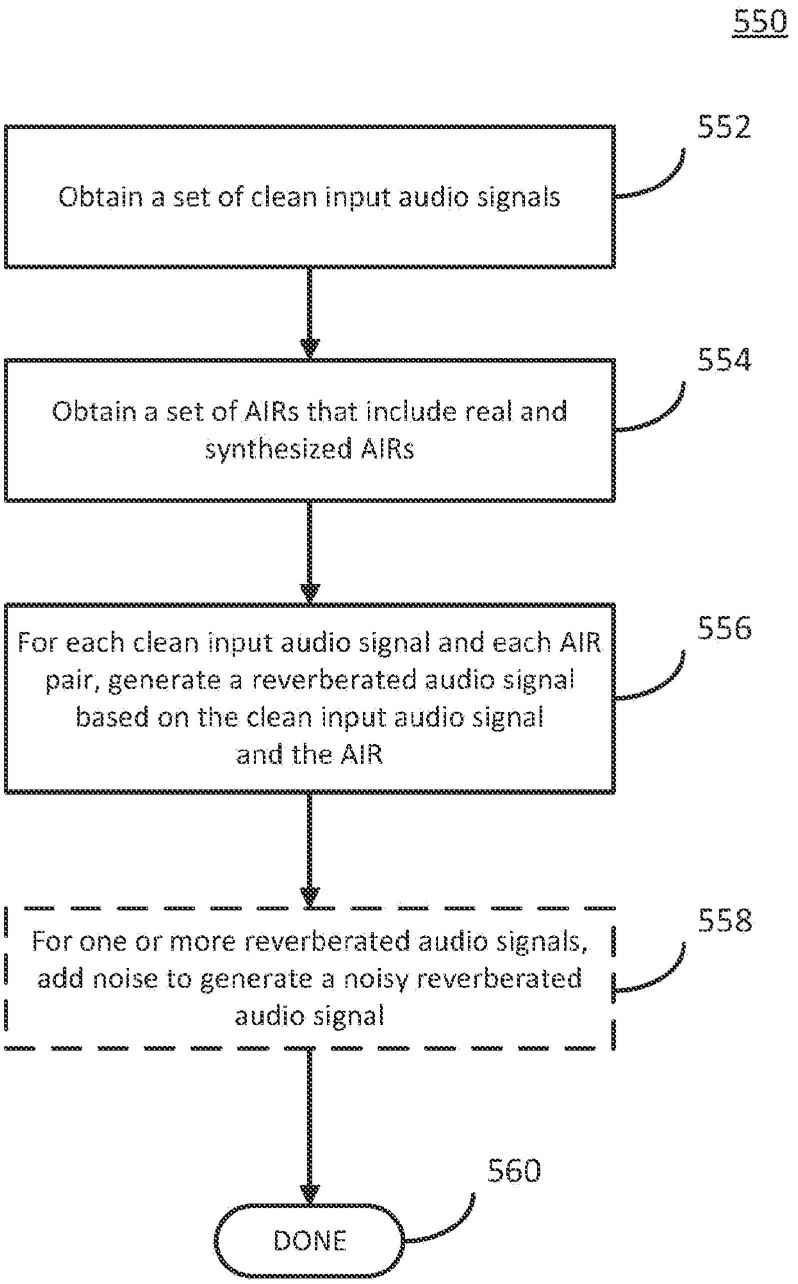
FIG. 5B shows an example of a process for generating a training set using synthesized AIRs in accordance with some implementations.

FIG. 5B shows an example of a process 550 for generating an augmented training set using real and/or synthesized AIRs. The augmented training set may be used for training a machine learning model for dereverberating audio signals. In some implementations, blocks of process 550 may be implemented by a device suitable for generating an augmented training set, such as a server, a desktop computer, a laptop computer, or the like. In some implementations, the device may be the same as the device that implemented blocks of process 500, as shown in and described above in connection with FIG. 5A. In some implementations, two or more blocks of process 550 may be performed substantially in parallel. In some implementations, blocks of process 550 may be performed in an order other than what is shown in FIG. 5B. In some implementations, one or more blocks of process 550 may be omitted.

Process 550 can begin at 552 by obtaining a set of clean input audio signals (e.g., input audio signals without any reverberation and/or noise). The clean input audio signals in the set of clean input audio signals may have been recorded by any suitable number of devices (or microphones associated with any suitable number of devices). For example, in some implementations, two or more of the clean input audio signals may have been recorded by the same device. As another example, in some implementations, each of the clean input audio signals may have been recorded by a different device. In some implementations, two or more of the clean input audio signals may have been recorded in the same room environment. In some implementations, each of the clean input audio signals may have been recorded in a different room environment. In some implementations, a clean input audio signal in the set of clean input audio signals may include any combination of types of audible sounds, such as speech, music, sound effects, or the like. However, each clean input audio signal may be devoid of reverberation, echo, and/or noise.

At block 554, process 550 can obtain a set of AIRs that include real AIRs and/or synthesized AIRs. The set of AIRs may include any suitable number of AIRs (e.g., 100 AIRs, 200 AIRs, 500 AIRs, or the like). The set of AIRs may include any suitable ratio of real AIRs to synthesized AIRs, such as 90% synthesized AIRs and 10% real AIRs, 80% synthesized AIRs and 20% real AIRs, or the like. More detailed techniques for generating synthesized AIRs are shown in and described above in connection with FIG. 5A.

At block 556, process 550 can, for each pairwise combination of clean input audio signal in the set of clean input audio signals and AIR in the set of AIRs, generate a reverberated audio signal based on the clean input audio signal and the AIR. For example, in some implementations, process 550 can convolve the AIR with the clean input audio signal to generate the reverberated audio signal. In some implementations, given N clean input audio signals and M AIRs, process 550 can generate up to N×M reverberated audio signals.

In some implementations, at block 558, process 550 can, for one or more of the reverberated audio signals generated at block 556, add noise to generate a noisy reverberated audio signal. Examples of noise that may be added include white noise, pink noise, brown noise, multi-talker speech babble, or the like. Process 550 may add different types of noise to different reverberated audio signals. For example, in some implementations, process 550 may add white noise to a first reverberated audio signal to generate a first noisy reverberated audio signal. Continuing with this example, in some implementations, process 550 may add multi-talker speech babble type noise to the first reverberated audio signal to generate a second noisy reverberated audio signal. Continuing still further with this example, in some implementations, process 550 may add brown noise to a second reverberated audio signal to generate a third noisy reverberated audio signal. In other words, in some implementations, different versions of a noisy reverberated audio signal may generated by adding different types of noise to a reverberated audio signal. It should be noted that, in some implementations, block 558 may be omitted, and the training set may be generated without adding noise to any reverberated audio signals.

At the end of block 558, process 550 has generated a training set comprising multiple training samples. Each training sample may include a clean audio signal and a corresponding reverberated audio signal. The reverberated audio signal may or may not include added noise. It should be noted that, in some implementations, a single clean audio signal may be associated with multiple training samples. For example, a clean audio signal may be used to generate multiple reverberated audio signals by convolving the clean audio signal with multiple different AIRs. As another example, a single reverberated audio signal (e.g., generated by convolving a single clean audio signal with a single AIR) may be used to generated multiple noisy reverberated audio signals, each corresponding to a different type of noise added to the single reverberated audio signal. Accordingly, a single clean audio signal may be associated with 10, 20, 30, 100, or the like training samples, each comprising a different corresponding reverberated audio signal (or noisy reverberated audio signal).

In some implementations, an augmented training set may be generated for a particular type of audio content. For example, the particular type of audio content may correspond to a type of audio content for which dereverberation may be particularly difficult. By way of example, it may be difficult to perform dereverberation on audio signals that include far-field noise, such as the noise of a dog barking or a baby crying in the background of an audio signal that includes near-field speech (e.g., from a video conference, from an audio call, or the like). Difficulty in performing dereverberation on far-field noise may lead to poor noise management (e.g., denoising of the audio signal). Because dereverberation of far-field noise may be dependent on both room characteristics/acoustics and/or the particular noise, it may be difficult to train a model to perform dereverberation on such far-field noise. For example, a training dataset used to train such a model may not have enough training samples of the particular type of far-field noise present in an expansive set of room acoustics, thereby making the model trained with such a limited training set less robust. Accordingly, generating an augmented training set for a particular type of audio content may allow for a more robust model to be trained. In some implementations, the particular type of audio content may include particular types of sounds or events (e.g., a dog barking, a baby crying, an emergency siren passing by, or the like) and/or particular audio environments (e.g., an indoor environment, an outdoor environment, an indoor shared workspace, or the like). In some implementations, the augmented training set may be generated by first identifying a training set of audio signals that include the particular type of audio content. For example, a training set that includes dogs barking in the background of near-field speech may be obtained. As another example, a training set that includes a far-field siren passing by in the background of near-field speech may be obtained. In some implementations, because reverberation is generally present in indoor environments, a training set that includes audio content captured in indoor environments (and that does not include audio content generated in outdoor environments) may be obtained. Note that, in some implementations, the training set may be obtained by applying audio signals from a corpus of audio signals that classifies each audio signals as associated with the particular type of audio content. In some implementations, the augmented training set may be generated by applying synthesized AIRs and/or noise of a particular type (e.g., speech noise, indoor room noise, etc.) to the identified training set to generate the augmented training set.

It should be noted that, in some implementations, an augmented training set may be used for training speech enhancement models other than dereverberation models. For example, in some implementations, such an augmented training set may be used to train machine learning models for noise management (e.g., denoising), machine learning models that perform a combination of noise management and dereverberation, or the like.

A machine learning model for dereverberating audio signals may have various types of architectures. The machine learning model may take, as an input, a frequency-domain representation of a reverberated audio signal and produce, as an output, a predicted dereverberation mask that, when applied to the frequency-domain representation of the reverberated audio signal, generates a frequency-domain representation of a dereverberated (e.g., clean) audio signal. Example architecture types include a CNN, an LSTM, an RNN, a deep neural network, or the like. In some implementations, a machine learning model may combine two or more architecture types, such as a CNN and a recurrent element. In some such implementations, a CNN may be used to extract features of an input reverberated audio signal at different resolutions. In some implementations, a recurrent element may serve as a memory gate that controls an amount of previously provided input data that is used by the CNN. Use of a recurrent element in combination with a CNN may allow the machine learning model to produce smoother outputs. Additionally, use of a recurrent element in combination with a CNN may allow the machine learning model to achieve a higher accuracy and with a decreased training time. Accordingly, use of a recurrent element in combination with a CNN may improve computational efficiency by decreasing time and/or computational resources used to train a robust, accurate machine learning model for dereverberating audio signals. Examples of types of recurrent elements that may be used include a GRU, an LSTM network, an Elman RNN, and/or any other suitable type of recurrent element or architecture.

In some implementations, a recurrent element may be combined with a CNN such that the recurrent element and the CNN are in parallel. For example, outputs of the recurrent element may be provided to one or more layers of the CNN such that the CNN generates an output based on outputs of layers of the CNN and based on an output of the recurrent element.

In some implementations, a CNN utilized in a machine learning model may include multiple layers. Each layer may extract features of an input reverberated audio signal spectrum (e.g., a frequency-domain representation of the reverberated audio signal) at different resolutions. In some implementations, layers of the CNN may have different dilation factors. Use of dilation factors greater than 1 may effectively increase the receptive field of a convolution filter used for a particular layer having a dilation factor greater than 1 but without increasing the number of parameters. Use of dilation factors greater than 1 may therefore allow a machine learning model to be more robustly trained (by increasing receptive field size) while not increasing in complexity (e.g., by maintaining a number of parameters to be learned or optimized). In one example, a CNN may have a first group of layers, each having an increasing dilation rate, and a second group of layers, each having a decreasing dilation rate. In one specific example, the first group of layers may include 6 layers, having dilation factors of 1, 2, 4, 8, 12, and 20, respectively. Continuing with this example, the second group of layers may include 5 layers decreasing in dilation factor (e.g., 5 layers having dilation factors of 12, 8, 4, 2, and 1, respectively). The size of the receptive field considered by the CNN is related to the dilation factors, the convolution filter size, a stride size, and/or a pad size (e.g., whether or not the model is causal). By way of example, given 6 CNN layers with increasing dilation factors of 1, 2, 4, 8, 12, and 20, a convolution filter size of 3×3, a stride of 0, and a causal model, the CNN may have a total receptive field of (2×(1+2+4+8+12+20))+1 frames, or 95 frames. As another example, the same network with 0 dilation would have a receptive field size of (2*(1+1+1+1+1+1))+1=13. In some implementations, the total receptive field may correspond to a delay line duration that indicates a duration of the spectrum that is considered by the machine learning model. It should be noted that the dilation factors described above are merely exemplary. In some implementations, smaller dilation factors may be used to, for example, decrease a delay duration for real-time audio signal duration.

In some implementations, the machine learning model may be zero latency. In other words, the machine learning model may not use look ahead, or future data points. This is sometimes referred to as the machine learning model being causal. Conversely, in some implementations, the machine learning model may implement layers that utilize look ahead blocks.

Figure 6:
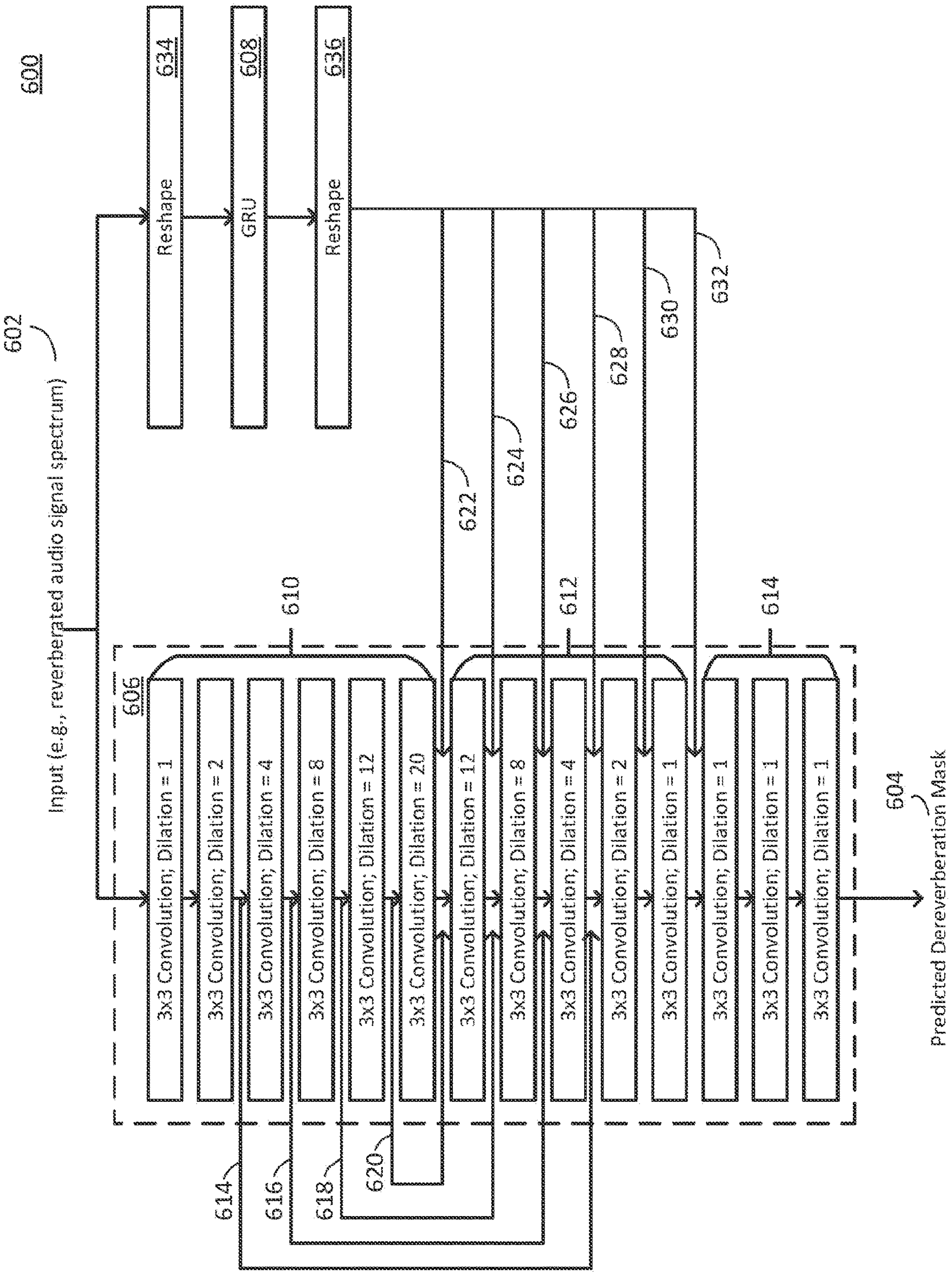
FIG. 6 shows an example architecture of a machine learning model for dereverberating audio signals in accordance with some implementations.

FIG. 6 shows an example of a machine learning model 600 that combines a CNN 606 and a GRU 608 in parallel. As illustrated, machine learning model 600 takes, as an input 602, a reverberated audio signal spectrum (e.g., a frequency-domain representation of the reverberated audio signal) and generates an output 604 corresponding to a predicted dereverberation mask.

As illustrated, CNN 606 includes a first set of layers 610 that have increasing dilation factors. In particular, first set of layer 610 includes 6 layers with dilation factors of 1, 2, 4, 8, 12, and 20, respectively. First set of layers 610 is followed by a second set of layers 612 that have decreasing dilation factors. In particular, second set of layers 612 includes 5 layers with dilation factors of 12, 8, 4, 2, and 1. Second set of layers 612 is followed by a third set of layers 614, which each have a dilation factor of 1. In some implementations, first set of layers 610, second set of layers 612, and third set of layers 614 may each include convolutional blocks. Each convolutional block may utilize a convolutional filter. Although CNN 606 utilizes convolutional filters of a 3×3 size, this is merely exemplary, and, in some implementations, other filter sizes (e.g., 4×4, 5×5, or the like) may be used. As illustrated in FIG. 6, each layer of CNN 606 may feed forward to a next, or subsequent layer of CNN 606. Additionally, in some implementations, an output of a layer with a particular dilation factor may be provided as an input to a second layer having the same dilation factor. For example, a layer of first set of layers 610 having a dilation factor of 2 may be provided via a connection 614 to a layer of second set of layers 612 having a dilation factor of 2. Connections 616, 618, and 620 similarly provide connections between layers having the same dilation factors.

As illustrated in FIG. 6, an output of GRU 608 may be provided to various layers of CNN 606 such that CNN 606 generates output 604 based on the layers of CNN 606 as well as the output of GRU 608. For example, as illustrated in FIG. 6, GRU 608 may provide an output to layers having decreasing dilation factors (e.g., to layers included in second set of layers 612) via connections 622, 624, 626, 628, 630, and 632. GRU 608 may have any suitable number of nodes (e.g., 48, 56, 64, or the like) and/or any suitable number of layers (e.g., 1, 2, 3, 4, 8, or the like). In some implementations, GRU 608 may be preceded by a first reshape block 634 which reshapes dimensions of input 602 to dimensions suitable for and/or required by GRU 608. A second reshape block 636 may follow GRU 608. Second reshape block 636 may reshape dimensions of an output generated by GRU 608 to dimensions suitable for provision to each layer of CNN 606 that receives the output of GRU 608.

In some implementations, a machine learning model may be trained using a loss function that indicates a degree of reverberation associated with a predicted dereverberated audio signal generated using a predicted dereverberation mask generated by the machine learning model. By training the machine learning model to minimize a loss function that includes an indication of a degree of reverberation, the machine learning model may not only generate dereverberated audio signals similar in content to the corresponding reverberated audio signals (e.g., including similar direct sound content as in the reverberated audio signal), but additionally, generate dereverberated audio signals with less reverberation. In some implementations, a loss term, for a particular training sample, may be a combination of a difference between a predicted dereverberated audio signal and a ground-truth clean audio signal and a degree of reverberation associated with the predicted dereverberated audio signal.

In some implementations, a degree of reverberation included in a loss function may be a speech-to-reverberation modulation energy. In some implementations, the speech-to-reverberation modulation energy may be a ratio of modulation energy at relatively high modulation frequencies relative to modulation energy over all modulation frequencies. In some implementations, the speech-to-reverberation modulation energy may be a ratio of modulation energy at relatively high modulation frequencies relative to modulation energy over relatively low modulation frequencies. In some implementations, relatively high modulation frequencies and relatively low modulation frequencies may be identified based on modulation filters. For example, in an instance in which modulation energy is determined at M modulation frequency bands, the highest N of the M (e.g., 3, 4, 5, etc.) modulation frequency bands may be considered as corresponding to "high modulation frequencies," and the remaining bands (e.g., M−N) may be considered as corresponding to "low modulation frequencies."

Figure 7:
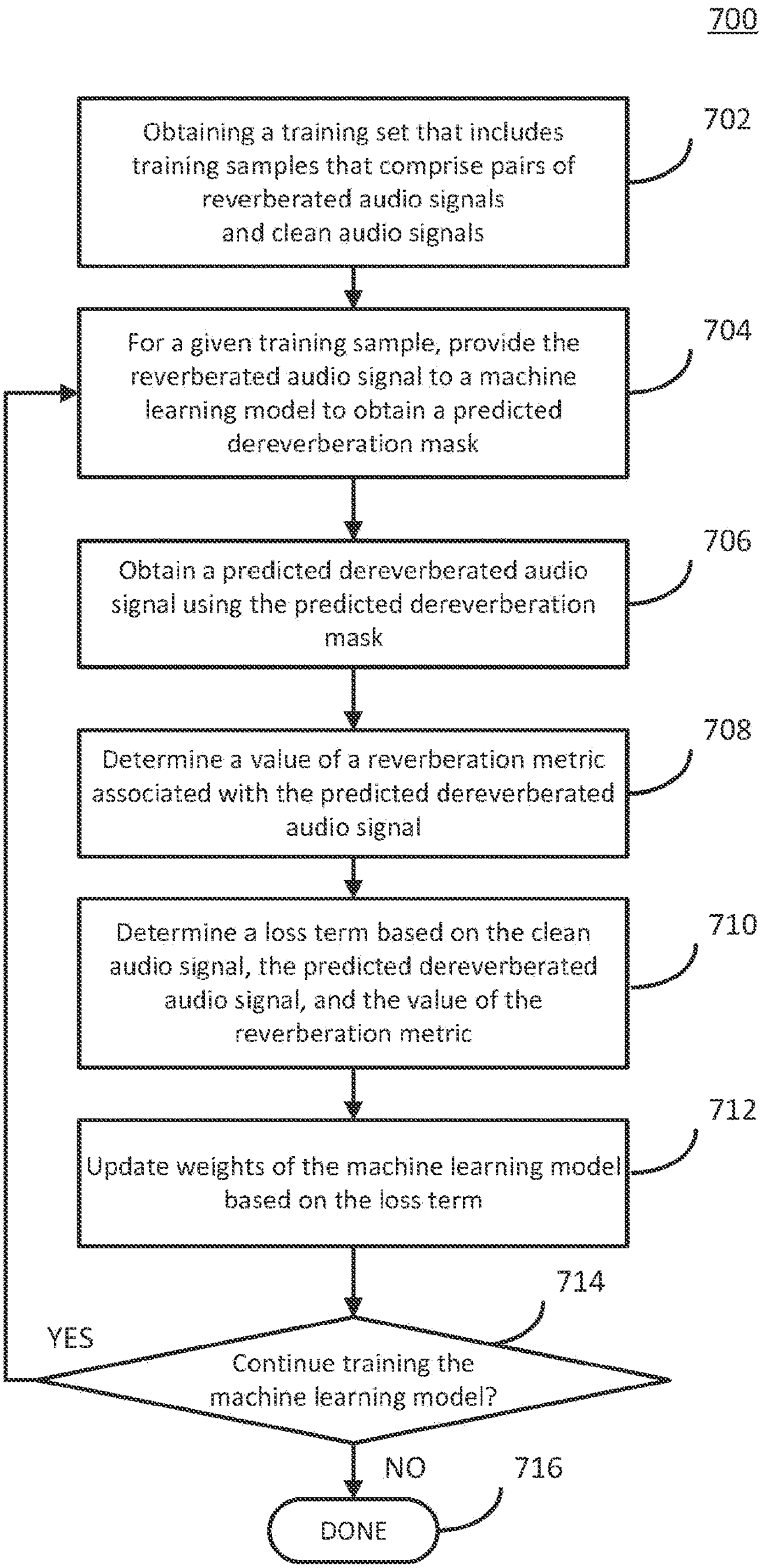
FIG. 7 shows an example process for training a machine learning model for dereverberating audio signals in accordance with some implementations.

FIG. 7 shows an example of a process 700 for training a machine learning model using a loss function that incorporates a degree of reverberation of a predicted dereverberated audio signal in accordance with some implementations. In some implementations, blocks of process 700 may be implemented by a device, such as a server, a desktop computer, a laptop computer, or the like. In instances in which an augmented training set is constructed to train the machine learning model, a device that implements blocks of process 700 may be the same device or a different device as that used to construct the augmented training set. In some implementations, two or more blocks of process 700 may be executed substantially in parallel. In some implementations, blocks of process 700 may be performed in an order other than what is shown in FIG. 7. In some implementations, one or more blocks of process 700 may be omitted.

Process 700 can begin at 702 by obtaining a training set that includes training samples that comprise pairs of reverberated audio signals and clean audio signals. In some implementations, the clean audio signals may be considered "ground-truth" signals that the machine learning model is to be trained to predict, or generate. In some implementations, the training set may be an augmented training set that has been constructed using synthesized AIRs, as described above in connection with FIGS. 4A, 4B, 5A, and 5B. In some implementations, process 700 may obtain the training set from a database, a remote server, or the like.

At 704, for a given training sample (e.g., for a given pair of a reverberated audio signal and a clean audio signal), process 700 can provide the reverberated audio signal to a machine learning model to obtain a predicted dereverberation mask. In some implementations, process 700 may provide the reverberated audio signal by determining a frequency-domain representation of the reverberated audio signal and providing the frequency-domain representation of the reverberated audio signal. In some implementations, the frequency-domain representation of the reverberated audio signal may have been filtered or otherwise transformed using a filter that approximates filtering of the human cochlea, as shown in and described above in connection with block 304 of FIG. 3.

It should be noted that the machine learning model may have any suitable architecture. For example, the machine learning model may include a deep neural network, a CNN, an LSTM, an RNN, or the like. In some implementations, the machine learning model may combine two or more architectures, such as a CNN and a recurrent element. In some implementations, a CNN may use dilation factors at different layers. A specific example of a machine learning model that may be used is shown in and described above in connection with FIG. 6.

At 706, process 700 can obtain a predicted dereverberated audio signal using the predicted dereverberation mask. For example, in some implementations, process 700 can apply the predicted dereverberation mask to the frequency-domain representation of the reverberated audio signal to obtain a frequency-domain representation of the dereverberated audio signal, as shown in and described above in connection with block 310 of FIG. 3. Continuing with this example, in some implementations, process 700 can then generate a time-domain representation of the dereverberated audio signal, as shown in and described above in connection with block 312 of FIG. 3.

At 708, process 700 can determine a value of a reverberation metric associated with the predicted dereverberated audio signal. The reverberation metric may be a speech-to-reverberation modulation energy (generally denoted herein as $f_{srmr}(z)$, where z is the predicted dereverberated audio signal) of one or more frames of the predicted dereverberated audio signal. An example equation to determine the speech-to-reverberation modulation energy that considers a ratio of energy in relatively high modulation frequencies to energy in relatively low modulation frequencies is given by:

$$f_{srmr}(z) = \frac{1}{23}\sum_{j=1}^{23}\frac{\sum_{k=1}^{4} z_{j,k}}{\sum_{k=5}^{8} z_{j,k}}$$

In the equation given above, $z_{j,k}$ represents the average modulation energy over frames of the $j^{th}$ critical band grouped by the $k^{th}$ modulation filter, where there are 23 critical bands and 8 modulation bands. Higher values of $f_{srmr}(z)$ are indicative of a higher degree of reverberation. It should be noted that other numbers of critical bands and/or modulation bands may be used to determine the speech-to-reverberation modulation energy.

At 710, process 700 can determine a loss term based on the clean audio signal, the predicted dereverberated audio signal, and the value of the reverberation metric. In some implementations, the loss term may be a combination of a difference between the clean audio signal and the predicted dereverberated audio signal and the value of the reverberation metric. In some implementations, the combination may be a weighted sum, where the value of the reverberation metric is weighted by an importance of minimizing reverberation in outputs produced using the machine learning model. An example equation of the loss term for a particular predicted dereverberated audio signal (denoted herein as ypre) and a particular clean audio signal (denoted herein as yref) is given by:

$$\text{loss} = (y_{pre} - y_{ref})^2 + w * f_{srmr}(z)$$

As illustrated in the above equation, the loss term may be increased in instances in which there is a relatively high degree of reverberation in the predicted clean audio signal and/or in which the predicted dereverberated audio signal differs substantially from the ground-truth clean audio signal.

At 712, process 700 can update weights of the machine learning model based at least in part on the loss term. For example, in some implementations, process 700 may use gradient descent and/or any other suitable technique to calculate updated weight values associated with the machine learning model. The weights may be updated based on other factors, such as a learning rate, a dropout rate, etc. The weights may be associated with various nodes, layers, etc., of the machine learning model.

At block 714, process 700 can determine whether the machine learning model is to continue being trained. Process 700 can determine whether the machine learning model is to continue being trained based on a determination of whether a stopping criteria has been reached. The stopping criteria may include a determination that an error associated with the machine learning model has decreased below a predetermined error threshold, that weights associated with the machine learning model are being changed from one iteration to a next by less than a predetermined change threshold, and/or the like.

If, at block 714, process 700 determines that the machine learning model is not to continue being trained ("no" at block 714), process 700 can end at 716. Conversely, if, at block 714, process 700 determines that the machine learning model is to continue being trained ("yes" at block 714), process 700 can loop back to 704 and can loop through blocks 704-714 with a different training sample.

Figure 8:
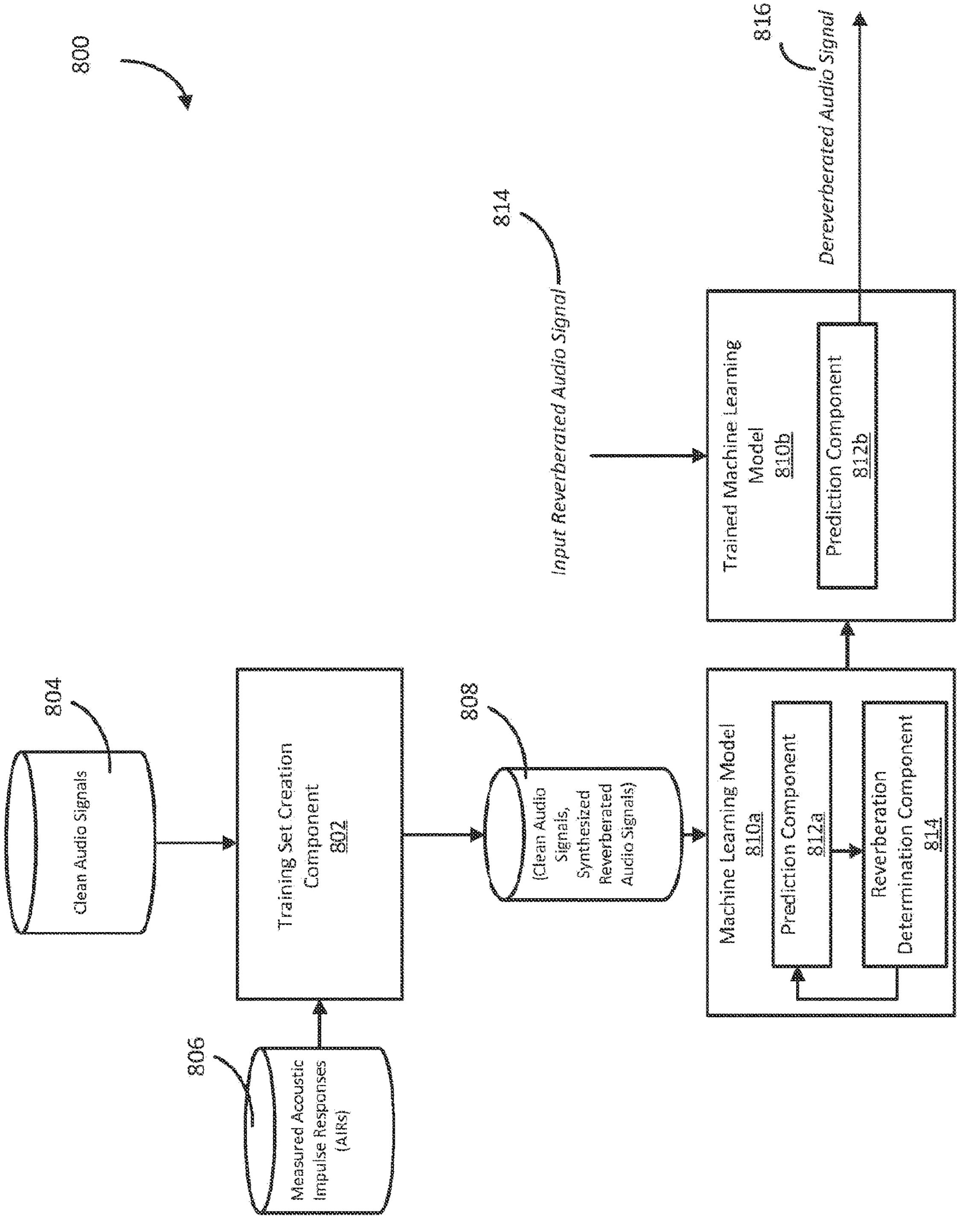
FIG. 8 shows a block diagram of an example system for performing dereverberation of audio signals in accordance with some implementations.

In some implementations, an augmented training set (e.g., as described above in connection with FIGS. 4A, 4B, 5A, and 5B) may be used in connection with a machine learning model that utilizes a loss function that incorporates a degree of reverberation of a predicted clean audio signal, as described above in connection with FIG. 7. In some implementations, the machine learning model may have an architecture that incorporates a CNN and a GRU in parallel, as shown in and described above in connection with FIG. 6. By combining an augmented training set that includes training samples generated using synthesized AIRs with a machine learning model that utilizes a reverberation metric in a loss function that is optimized, and which may optionally have an architecture that utilizes both a CNN and a GRU, the machine learning model may be able to be efficiently trained (e.g., in a manner that minimizes computational resources) while achieving both a high degree of accuracy in a predicted dereverberated audio signal and a low degree of reverberation in the predicted dereverberated audio signal. Such a system may be particularly useful for dereverberation of real-time audio signals, which may require training on an expansive training set and a low-latency machine learning model architecture. FIG. 8 shows a schematic diagram of an example system 800 that utilizes an augmented training set in connection with a machine learning model that utilizes a loss function that incorporates a degree of reverberation metric.

As illustrated, system 800 includes a training set creation component 802. Training set creation component 802 may generate an augmented training set that may be used by a machine learning model for dereverberating audio signals. In some implementations, training set component 802 may be implemented, for example, on a device that generates and/or stores an augmented training set. Training set creation component 802 may retrieve measured AIRs from an AIR database 806. Training set creation component 802 may then generate synthesized AIRs based on the measured AIRs retrieved from AIR database 806. More detailed techniques for generating synthesized AIRs are shown in and described above in connection with FIGS. 4A, 4B, and 5A. Training set creation component 802 can retrieve clean audio signals from clean audio signals database 804. Training set creation component 802 can then generate an augmented training set 808 based on the measured AIRs, the synthesized AIRs, and the clean audio signals. More detailed techniques for generating an augmented training set are shown in and described above in connection with FIG. 5B. Augmented training set 808 may include multiple (e.g., one hundred, one thousand, ten thousand, or the like) training samples, with each training sample being a pair of a clean audio signal (e.g., retrieved from clean audio signal database 804) and a corresponding reverberated audio signal generated by training set creation component 802 based on a single AIR (either a measured AIR or a synthesized AIR).

Augmented training set 808 may then be used to train a machine learning model 810*a*. In some implementations, machine learning model 810*a* may have an architecture that includes a CNN and a recurrent element (e.g., a GRU, an LSTM network, an Elman RNN, or the like) in parallel. In particular, the CNN may generate an output based on outputs of layers of the CNN as well as an output of the recurrent element. An example of such an architecture is shown in and described above in connection with FIG. 6. Machine learning model 810*a* may include a prediction component 812*a* and a reverberation determination component 814. Prediction component 812*a* may generate, for a reverberated audio signal obtained from augmented training set 808, a predicted dereverberated audio signal. Examples for generating the predicted dereverberated audio signal are described above in more detail in connection with FIGS. 2, 3, 5 and 7. Reverberation determination component 814 may determine a degree of reverberation in the predicted dereverberated audio signal. For example, the degree of reverberation may be based on a speech-to-reverberation modulation energy, as described above in connection with block 708 of FIG. 7. The degree of reverberation may be used to update weights associated with prediction component 812*a*. For example, the degree of reverberation may be included in a loss function that is minimized or optimized to update weights associated with prediction component 812*a*, as shown in and described above in connection with blocks 710 and 712 of FIG. 7.

After training, trained machine learning model 810*b* may utilize trained prediction component 812*b* (e.g., corresponding to finalized weights) to generate dereverberated audio signals. For example, trained machine learning model 810*b* may take, as an input, a reverberated audio signal 814, and may generate, as an output, a dereverberated audio signal 816. It should be noted that trained machine learning model 810*b* may have the same architecture as machine learning model 810*a*, but may not determine a degree of reverberation at inference time.

Figure 9:
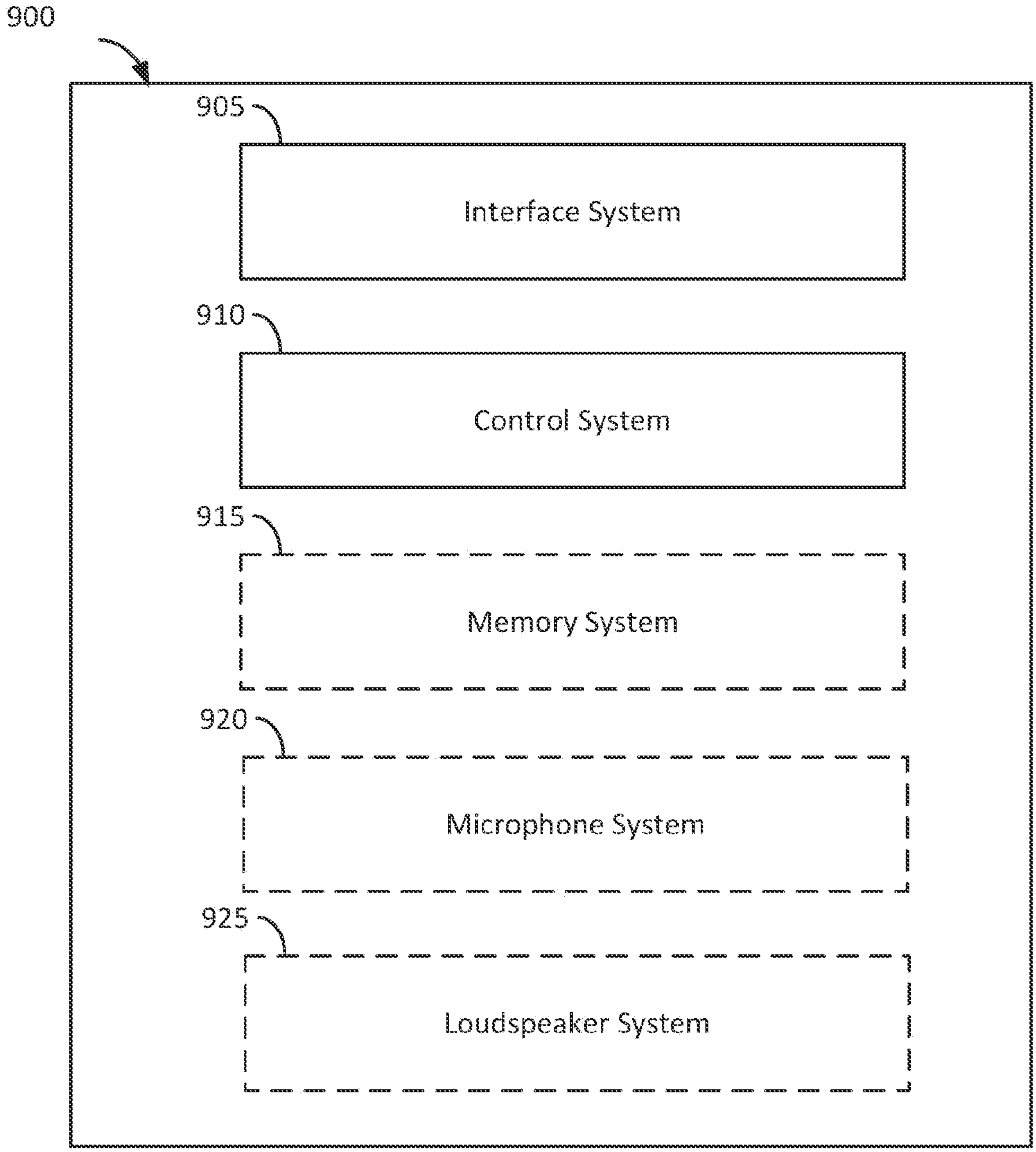
FIG. 9 shows a block diagram that illustrates examples of components of an apparatus capable of implementing various aspects of this disclosure.

FIG. 9 is a block diagram that shows examples of components of an apparatus capable of implementing various aspects of this disclosure. As with other figures provided herein, the types and numbers of elements shown in FIG. 9 are merely provided by way of example. Other implementations may include more, fewer and/or different types and numbers of elements. According to some examples, the apparatus 900 may be configured for performing at least some of the methods disclosed herein. In some implementations, the apparatus 900 may be, or may include, a television, one or more components of an audio system, a mobile device (such as a cellular telephone), a laptop computer, a tablet device, a smart speaker, or another type of device.

According to some alternative implementations the apparatus 900 may be, or may include, a server. In some such examples, the apparatus 900 may be, or may include, an encoder. Accordingly, in some instances the apparatus 900 may be a device that is configured for use within an audio environment, such as a home audio environment, whereas in other instances the apparatus 900 may be a device that is configured for use in "the cloud," e.g., a server.

In this example, the apparatus 900 includes an interface system 905 and a control system 910. The interface system 905 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 905 may, in some implementations, be configured for exchanging control information and associated data with audio devices of the audio environment. The control information and associated data may, in some examples, pertain to one or more software applications that the apparatus 900 is executing.

The interface system 905 may, in some implementations, be configured for receiving, or for providing, a content stream. The content stream may include audio data. The audio data may include, but may not be limited to, audio signals. In some instances, the audio data may include spatial data, such as channel data and/or spatial metadata. In some examples, the content stream may include video data and audio data corresponding to the video data.

The interface system 905 may include one or more network interfaces and/or one or more external device interfaces (such as one or more universal serial bus (USB) interfaces). According to some implementations, the interface system 905 may include one or more wireless interfaces. The interface system 905 may include one or more devices for implementing a user interface, such as one or more microphones, one or more speakers, a display system, a touch sensor system and/or a gesture sensor system. In some examples, the interface system 905 may include one or more interfaces between the control system 910 and a memory system, such as the optional memory system 915 shown in FIG. 9. However, the control system 910 may include a memory system in some instances. The interface system 905 may, in some implementations, be configured for receiving input from one or more microphones in an environment.

The control system 910 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 910 may reside in more than one device. For example, in some implementations a portion of the control system 910 may reside in a device within one of the environments depicted herein and another portion of the control system 910 may reside in a device that is outside the environment, such as a server, a mobile device (e.g., a smartphone or a tablet computer), etc. In other examples, a portion of the control system 910 may reside in a device within one environment and another portion of the control system 910 may reside in one or more other devices of the environment. For example, a portion of the control system 910 may reside in a device that is implementing a cloud-based service, such as a server, and another portion of the control system 910 may reside in another device that is implementing the cloud-based service, such as another server, a memory device, etc. The interface system 905 also may, in some examples, reside in more than one device.

In some implementations, the control system 910 may be configured for performing, at least in part, the methods disclosed herein. According to some examples, the control system 910 may be configured for implementing methods of dereverberating audio signals, training a machine learning model that performs dereverberation of audio signals, generating a training set for a machine learning model that performs dereverberation of audio signals, generating synthesized AIRs for inclusion in a training set, or the like.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 915 shown in FIG. 9 and/or in the control system 910. Accordingly, various innovative aspects of the subject matter described in this disclosure can be implemented in one or more non-transitory media having software stored thereon. The software may, for example, include instructions for dereverberating audio signals using a trained machine learning model, training a machine learning model that performs dereverberation of audio signals, generating one or more synthesized AIRs, generating a training set for training a machine learning model that performs dereverberation of audio signals, etc. The software may, for example, be executable by one or more components of a control system such as the control system 910 of FIG. 9.

In some examples, the apparatus 900 may include the optional microphone system 920 shown in FIG. 9. The optional microphone system 920 may include one or more microphones. In some implementations, one or more of the microphones may be part of, or associated with, another device, such as a speaker of the speaker system, a smart audio device, etc. In some examples, the apparatus 900 may not include a microphone system 920. However, in some such implementations the apparatus 900 may nonetheless be configured to receive microphone data for one or more microphones in an audio environment via the interface system 910. In some such implementations, a cloud-based implementation of the apparatus 900 may be configured to receive microphone data, or a noise metric corresponding at least in part to the microphone data, from one or more microphones in an audio environment via the interface system 910.

According to some implementations, the apparatus 900 may include the optional loudspeaker system 925 shown in FIG. 9. The optional loudspeaker system 925 may include one or more loudspeakers, which also may be referred to herein as "speakers" or, more generally, as "audio reproduction transducers." In some examples (e.g., cloud-based implementations), the apparatus 900 may not include a loudspeaker system 925. In some implementations, the apparatus 900 may include headphones. Headphones may be connected or coupled to the apparatus 900 via a headphone jack or via a wireless connection (e.g., BLUETOOTH).

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. A method for enhancing audio signals, the method comprising:

(a) obtaining, by a control system, a training set comprising a plurality of training samples, each training sample of the plurality of training samples comprising a distorted audio signal and a corresponding clean audio signal;

(b) for a training sample of the plurality of training samples:

obtaining, by the control system, a frequency-domain representation of the distorted audio signal, providing, by the control system, the frequency-domain representation of the distorted audio signal to a convolutional neural network (CNN) comprising a plurality of convolutional layers and providing, in parallel, the frequency domain representation to a recurrent element, wherein an output of the recurrent element is provided to a subset of the plurality of convolutional layers, generating, by the control system and using the CNN, a predicted enhancement mask, wherein the CNN generates the predicted enhancement mask based at least in part on the output of the recurrent element;

generating, by the control system, a predicted enhanced audio signal based at least in part on the predicted enhancement mask, and updating, by the control system, weights associated with the CNN and the recurrent element based at least in part on the predicted enhanced audio signal and the corresponding clean audio signal; and (c) repeating (b) by the control system until a stopping criteria is reached, wherein the updated weights at a time the stopping criteria is reached correspond to a trained machine learning model for enhancing audio signals.

2. The method of claim 1, wherein obtaining the frequency-domain representation of the distorted audio signal comprises:

generating an initial frequency-domain representation of the distorted audio signal; and applying a filter that represents filtering of a human cochlea to the initial frequency-domain representation of the distorted audio signal to generate the frequency-domain representation of the distorted audio signal.

3. The method of claim 1, wherein the plurality of convolutional layers comprise a first subset of convolutional layers with increasing dilation values and a second subset of convolutional layers with decreasing dilation values.

4. The method of claim 3, wherein an output of a convolutional layer of the first subset of convolutional layers is passed to a convolutional layer of the second subset of convolutional layers having a same dilation value.

5. The method of claim 4, wherein the output of the recurrent element is provided to the second subset of convolutional layers.

6. The method of claim 1, wherein the output of the recurrent element is provided to the subset of the plurality of convolutional layers by reshaping the output of the recurrent element.

7. The method of claim 1, wherein generating the predicted enhanced audio signal comprises multiplying the predicted enhancement mask by the frequency-domain representation of the distorted audio signal.

8. The method of claim 1, further comprising using the updated weights to generate at least one enhanced audio signal by providing a distorted audio signal to the trained machine learning model.

9. The method of claim 1, wherein the recurrent element is at least one of a gated recurrent unit (GRU) a long short-term memory (LSTM) network or an Elman recurrent neural network (RNN).

10. The method of claim 1, wherein the distorted audio signal includes reverberation and/or noise.

11. The method of claim 1, wherein updating the weights associated with the CNN and the recurrent element comprises determining a loss term based at least in part on a degree of reverberation present in the predicted enhanced audio signal.

12. A method for enhancing audio signals, comprising:

obtaining, by a control system, a distorted audio signal;

generating, by the control system, a frequency-domain representation of the distorted audio signal;

providing, by the control system, the frequency-domain representation to a trained machine learning model, wherein the trained machine learning model comprises a convolutional neural network (CNN) comprising a plurality of convolutional layers and providing, in parallel, the frequency domain representation to a recurrent element, wherein an output of the recurrent element is provided to a subset of the plurality of convolutional layers;

determining, by the control system, an enhancement mask based on an output of the trained machine learning model;

generating, by the control system, a spectrum of an enhanced audio signal based at least in part on the enhancement mask and the distorted audio signal; and generating, by the control system, the enhanced audio signal based on the spectrum of the enhanced audio signal.

13. The method of claim 12, wherein obtaining the frequency-domain representation of the distorted audio signal comprises:

generating an initial frequency-domain representation of the distorted audio signal; and applying a filter that represents filtering of a human cochlea to the initial frequency-domain representation of the distorted audio signal to generate the frequency-domain representation of the distorted audio signal.

14. The method of claim 13, wherein the plurality of convolutional layers comprise a first subset of convolutional layers with increasing dilation values and a second subset of convolutional layers with decreasing dilation values.

15. The method of claim 14, wherein an output of a convolutional layer of the first subset of convolutional layers is passed to a convolutional layer of the second subset of convolutional layers having a same dilation value.

16. The method of claim 14, wherein the output of the recurrent element is provided to the second subset of convolutional layers.

17. The method of claim 12, wherein the output of the recurrent element is provided to the subset of the plurality of convolutional layers by reshaping the output of the recurrent element.

18. The method of claim 12, wherein the recurrent element is at least one of a gated recurrent unit (GRU), a long short-term memory (LSTM) network or an Elman recurrent neural network (RNN).

19. The method of claim 12, wherein generating the enhanced audio signal comprises multiplying the enhancement mask by the frequency-domain representation of the distorted audio signal.

20. The method of claim 12, wherein the distorted audio signal is a live-captured audio signal and/or includes one or more of reverberation or noise.

* * * * *